(12) United States Patent
Liu et al.

(10) Patent No.: US 11,458,437 B2
(45) Date of Patent: Oct. 4, 2022

(54) UNIVERSAL PLANAR MEMBRANE DEVICE FOR MASS TRANSFER

(71) Applicant: Molecule Works Inc., Richland, WA (US)

(72) Inventors: Wei Liu, Richland, WA (US); Anirudh Balram, Richland, WA (US)

(73) Assignee: Molecule Works Inc., Richland, WA (US)

( * ) Notice: Subject to any disclaimer, the term of this patent is extended or adjusted under 35 U.S.C. 154(b) by 0 days.

(21) Appl. No.: 17/013,580

(22) Filed: Sep. 5, 2020

(65) Prior Publication Data
US 2021/0069651 A1 Mar. 11, 2021

Related U.S. Application Data

(60) Provisional application No. 62/896,322, filed on Sep. 5, 2019.

(51) Int. Cl.
| | |
|---|---|
| *B01D 53/22* | (2006.01) |
| *B01D 63/08* | (2006.01) |
| *B01D 61/18* | (2006.01) |
| *B01D 69/10* | (2006.01) |
| *B01D 65/08* | (2006.01) |

(52) U.S. Cl.
CPC ........... *B01D 63/082* (2013.01); *B01D 61/18* (2013.01); *B01D 65/08* (2013.01); *B01D 69/10* (2013.01); *B01D 2313/143* (2013.01); *B01D 2315/10* (2013.01)

(58) Field of Classification Search
CPC ...... B01D 69/10; B01D 65/08; B01D 63/082; B01D 61/18; B01D 2315/10; B01D 2313/143
See application file for complete search history.

(56) References Cited

U.S. PATENT DOCUMENTS

| | | | | |
|---|---|---|---|---|
| 5,711,882 | A | * | 1/1998 | Hofmann ............... B01D 63/10 95/55 |
| 5,996,976 | A | | 12/1999 | Murphy et al. |
| 6,126,723 | A | | 10/2000 | Drost et al. |

(Continued)

FOREIGN PATENT DOCUMENTS

| | | |
|---|---|---|
| EP | 3047894 A1 | 7/2016 |
| WO | 2020254208 A1 | 12/2020 |
| WO | 2021259760 A1 | 12/2021 |

*Primary Examiner* — Anthony R Shumate
(74) *Attorney, Agent, or Firm* — The Marbury Law Group, PLLC

(57) ABSTRACT

A membrane device is presented that can used for a wide range of applications from once-through filtration, crossflow filtration, molecular separation, gas/liquid absorption or reaction, gas dispersion into liquid, and degassing of liquid. The device comprises a thin flat sheet membrane that allows certain fluid or molecules go through while blocking others. The membrane sheet is fixed on a supporting structure with mini channel on two sides of the membrane for respective feed and sweep flows. The membrane sheet is sealed with gaskets with two cover plates that the membrane sheet can be replaced or cleaned. The cover plate provides connection ports to connect the feed fluid to the feed channels on one membrane surface and to connect the sweep fluid to the sweep channels on the other surface of the membrane.

24 Claims, 26 Drawing Sheets

(56) References Cited

U.S. PATENT DOCUMENTS

| | | | |
|---|---|---|---|
| 6,824,592 B2 | 11/2004 | Monzyk et al. | |
| 6,841,601 B2 | 1/2005 | Serpico et al. | |
| 6,974,496 B2 | 12/2005 | Wegeng et al. | |
| 8,317,906 B2 | 11/2012 | Bansal | |
| 8,623,210 B2 | 1/2014 | Manabe et al. | |
| 8,673,059 B2 | 3/2014 | Leta et al. | |
| 10,363,516 B2 | 7/2019 | Sundaram | |
| 11,285,425 B2 | 3/2022 | Sauerbeck et al. | |
| 2006/0131235 A1* | 6/2006 | Offeman | B01D 61/362 210/321.83 |
| 2010/0304953 A1* | 12/2010 | Liu | B01D 71/028 502/4 |
| 2011/0155662 A1* | 6/2011 | Liu | B01D 67/0046 210/510.1 |
| 2014/0238235 A1* | 8/2014 | Liu | B01D 63/084 95/52 |
| 2016/0151740 A1* | 6/2016 | Ouchi | B01D 71/021 422/212 |
| 2016/0158693 A1* | 6/2016 | Ouchi | B01D 63/10 422/222 |
| 2017/0056788 A1 | 3/2017 | Liu et al. | |
| 2018/0272260 A1 | 9/2018 | Robertson et al. | |
| 2020/0122090 A1* | 4/2020 | Kitaura | B01D 69/12 |
| 2020/0164315 A1* | 5/2020 | Okazaki | B32B 3/28 |
| 2020/0306697 A1* | 10/2020 | Kutowy | B01D 63/082 |
| 2021/0077978 A1 | 3/2021 | Lai et al. | |
| 2021/0093993 A1 | 4/2021 | Strand et al. | |
| 2021/0170327 A1* | 6/2021 | Ehlert | B01D 63/082 |

\* cited by examiner

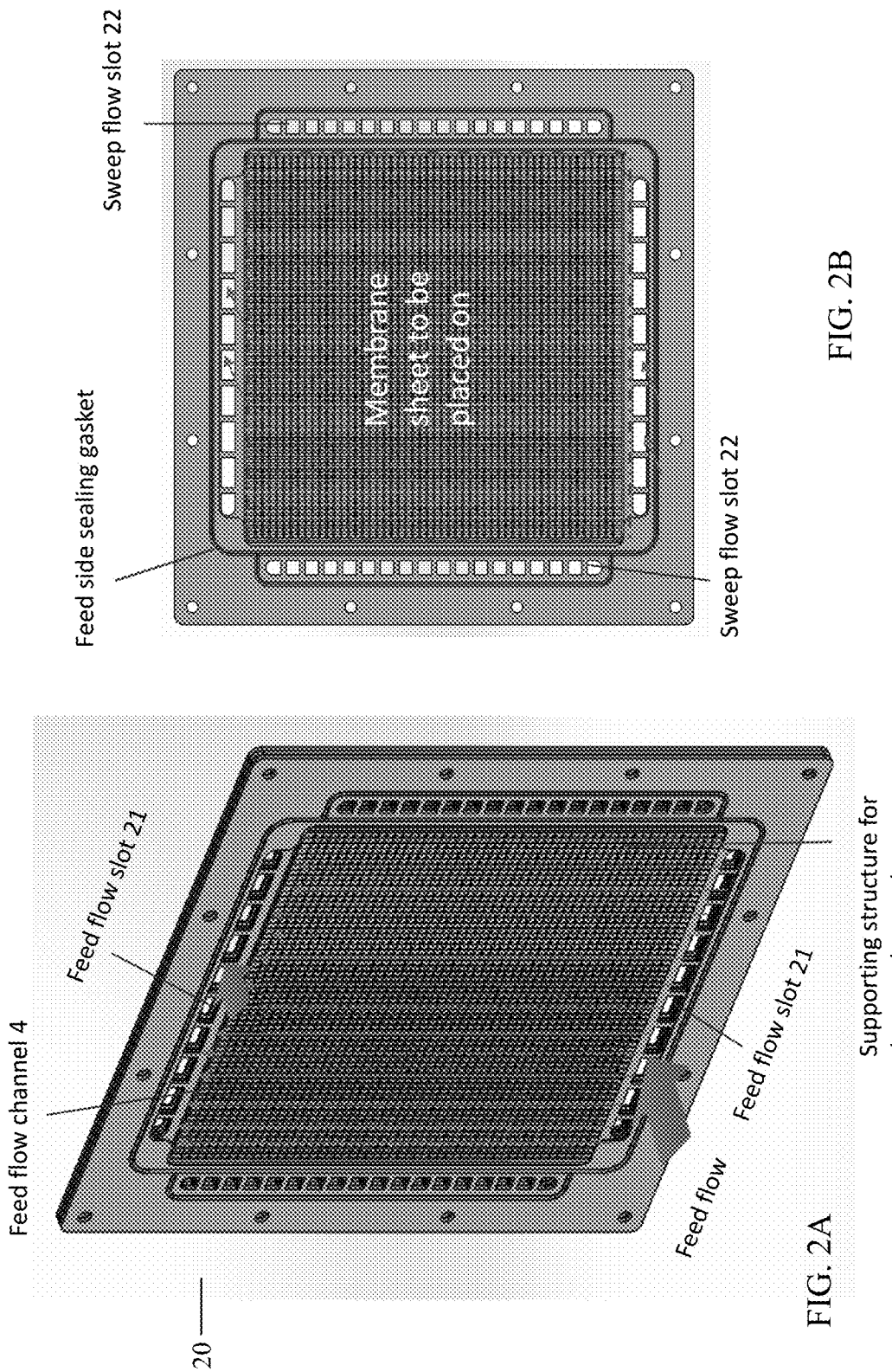

(b). Micro-structure of PTFE coating (a). Hydrophobicity of the PTFE coated surface (a). Surface texture (b). Inter-grown zeolite crystals

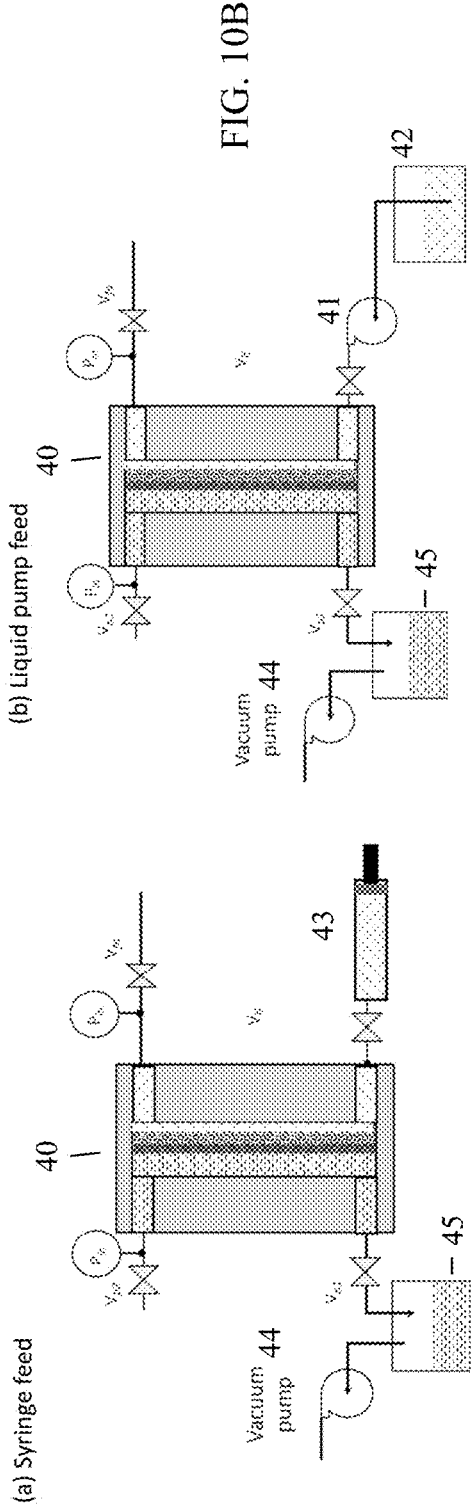
FIG. 10A
FIG. 10B
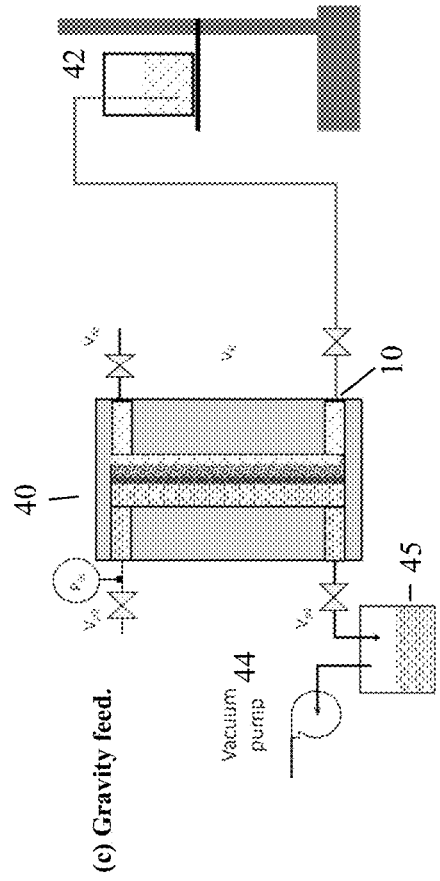
FIG. 10C (b). Variations of the DAC reaction with time (a). Rate constant under different conditions (b). Decomposition of the bicarbonate into $CO_2$ gas (a). Reacted potassium carbonate solution (b) Decrease of pH with time on stream at different gas rate (a) Pressure gradient required at different gas feed rate

UNIVERSAL PLANAR MEMBRANE DEVICE FOR MASS TRANSFER

RELATED APPLICATIONS

This application claims priority to U.S. Provisional Application No. 62/896,322 entitled "Universal Planar Membrane Device for Mass Transfer", filed Sep. 5, 2019, the entire contents of which are hereby incorporated by reference for all purposes.

FIELD OF THE INVENTION

This invention relates to a device for selective mass exchange or transfer between two sides of a membrane.

BACKGROUND

Mass transfer management may be performed by filtration, molecular separation, dehumidification, humidification, gas/liquid contacting, and liquid/liquid contacting. Mass transfer management control may be provided by use of a membrane or media that allows only certain species or fluids to go through while blocking the others. In large-scale applications, a designated unit may be built to meet a specific application's needs. However, in single function for laboratory or small-scale applications it is costly to have designated equipment. A versatile and compact device for such single function for laboratory or small-scale applications is needed that can be readily adapted to perform different functions.

Using planar membranes or media in such devices is of particular interest, because of the simple shape. Previously, different applications have been achieved by using different membrane materials and completely different devices. For example, particulate filtration is often conducted with a different device from humidification. U.S. Pat. No. 6,841,601 B2 describes a moisture exchange device for environmental management that uses water vapor selective sulfonated membranes, while U.S. Pat. No. 5,996,976 describes a gas humidification system for fuel cell 40 systems.

Another widespread membrane application example is ultrafiltration. Like gas humidification/drying, ultrafiltration is usually achieved by tubular, spiral, or flat modular devices. An example of flat membrane devices for concentration is described in U.S. Pat. No. 8,623,210 B2, in which a thin cellulose membrane is held between the support plates with serpentine flow. This type of system does not allow access to the membrane when maintenance is required. With that type of membrane cells, customized membrane materials and configuration limit the ability to use such cells interchangeably. The choice of membrane material is highly application specific. However, making a new configuration for each different type of membrane materials is not cost-effective or may not even be viable.

Given the vast array of membrane device applications, a general device that can accommodate different membrane materials and be used to perform different working functions is highly desirable. Such a membrane device allows for easy replacement of membranes. The membrane may be regenerated in-situ or ex-situ.

It is highly desirable in a variety of applications to bring liquid and gas streams in contact but still keeping the two streams separate from each other. A particularly relevant application of interest is one involving the capture of carbon dioxide in a liquid stream. U.S. Pat. No. 8,317,906 B2 describes making a polymeric PTFE microporous membrane with an oleophobic coating into a membrane contactor for gaseous $CO_2$ capture by an amine liquid. Other flat sheet membrane contactor devices are available in prior art for degassing. In U.S. Published Patent Application No. 20170056788A1, Liu et al. describes a compact membrane-based degassing device for application to liquid chromatography, in which two chambers are suitably isolated by a membrane with liquid flowing through parallel channels in and out of the feed side. The design of the device is more limited to relatively lower liquid flow rates. Such a design is not easily amenable to increasing surface area by stacking parallel plates as detailed in the invention described here. In EP3047894A1, continuous loop configuration of the membrane contactor was described to integrate absorption and desorption, which utilizes hollow fiber membranes. For the hollow fiber membrane module, the module needs to be remade if different membrane materials are used.

INVENTION SUMMARY

The various embodiments disclosed herein include a compact multi-functional device that encloses any appropriately sized thin, flat, selective membrane within two cell 40 plates to drive fluid flow or diffusion of species across the membrane via a concentration, pressure, partial pressure or chemical potential gradient. The unique device construction described herein allows for low hold-up volume and a wide range of gas and liquid flow rates at low pressure drops. The device can be operated with pressurized fluid flow or de-pressurized fluid flow (vacuum).

The various embodiments disclosed herein include a universal membrane separation device, enabling usage of a variety of thin flat-sheet membranes for a wide range of applications, including dead-end filtration, cross flow filtration, dehumidification, humidification, gas-liquid contactor and so on.

One aspect of the design feature is usage of gasket sealing with bolts that simplifies the manufacture and assembly of the membrane module. In such a device, the thin membrane sheet may be fixed on a built-in supporting structure and separates two flow streams that may be termed the feed and sweep side. There may be straight channels for both the feed and sweep fluids to flow throughout the membrane surface from one end of the membrane to the opposite end of the membrane sheet at small pressure drops. The feed and sweep fluids can be configured as crossflow or countercurrent flow.

In an embodiment, the device may include one or multiple membrane sheets in parallel. Regardless of the number of the membrane sheets in the device, the device includes one inlet and one outlet port for the feed fluid, and one inlet and one outlet port for the sweep fluid. The membrane supporting structure, the feed flow channel structures, and sweep flow channel structures may be the same for one or multiple membrane sheets. Thus, the processing capacity of device can be increased by numbering up the membrane sheets while maintaining the same mass transfer or separation characteristics.

The device can be made of transparent polymer for clear visualization of the membrane channel and surface. The device can be made of metallic materials for operation at higher temperatures and/or higher pressures. Alternatively, the device may be made of ceramic materials.

DESCRIPTION OF DRAWINGS

FIG. 2A is a perspective view illustrating the feed side of a membrane cassette half frame according to various embodiments.

FIG. 2B is a plan view of the membrane cassette half frame illustrated in FIG. 2A according to various embodiments.

FIG. 10A is a schematic illustration of a syringe liquid feed method for once-through filtration with vacuum pulled on the sweep (permeate) side according to various embodiments.

FIG. 10B is a schematic illustration of a liquid pump feed method for once-through filtration with vacuum pulled on the sweep (permeate) side according to various embodiments.

FIG. 10C is a schematic illustration of a gravity liquid feed method for once-through filtration with vacuum pulled on the sweep (permeate) side according to various embodiments.

DETAILED DEVICE DESCRIPTION

Figure 1:
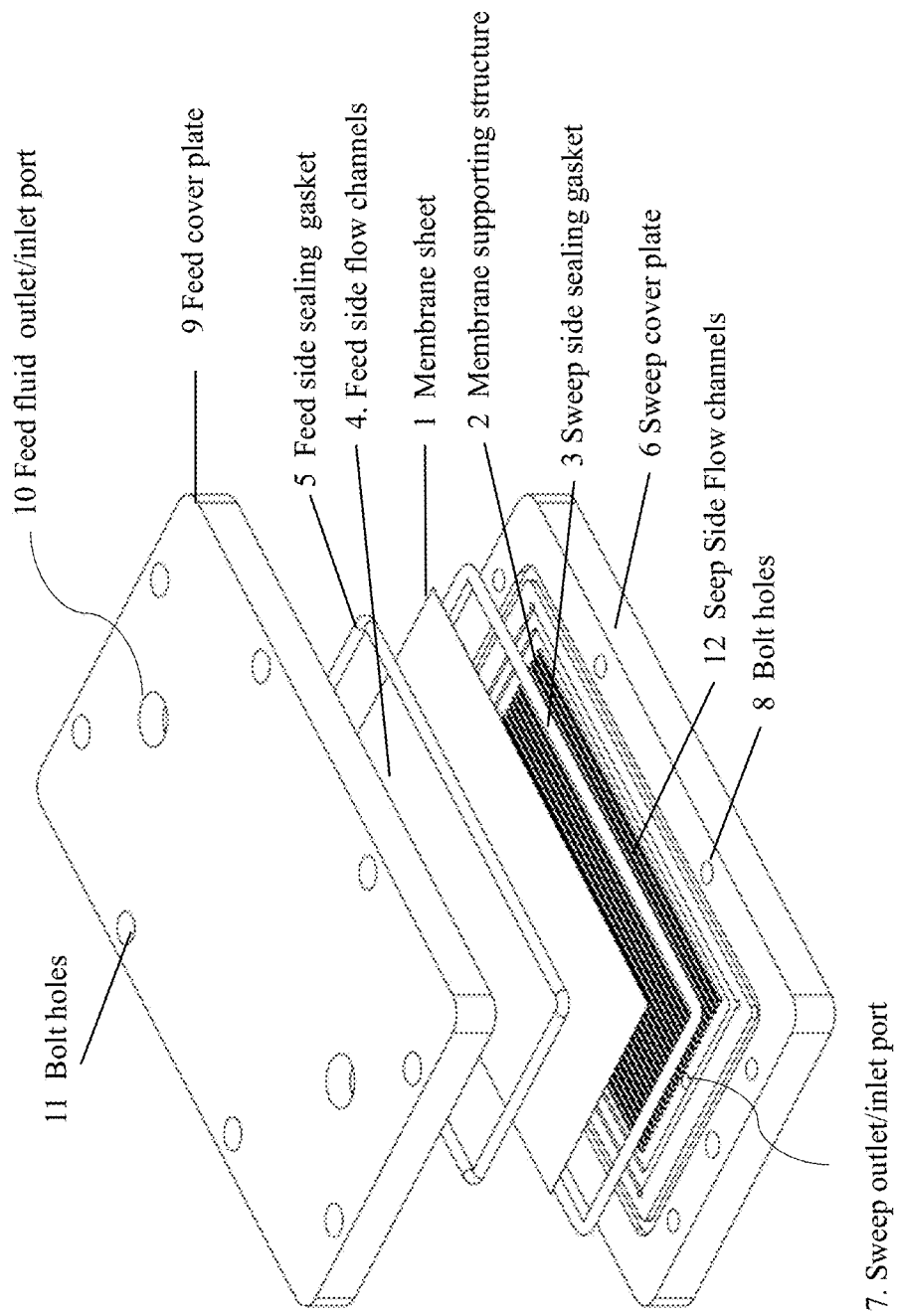
FIG. 1 is an exploded view illustrating components of device according to various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Basic components of an embodiment of the device are shown in FIG. 1. The thin flat sheet membrane 1 separates the feed fluids from the sweep fluid but allows a certain fraction of the feed fluid and sweep fluid or certain molecules of each to cross over. This cross over may be driven by a concentration, pressure, or chemical potential gradient between the two sides of the thin flat sheet membrane 1. The thin flat sheet membrane 1 may be 0.02 to 0.2 mm thick. The thin flat membrane sheet 1 may be supported by a supporting structure 2, such as a cassette frame. The supporting structure 2 can also provide sweep side flow channels 12 for the sweep fluid to flow. The sweep side flow channels 12 are preferably straight and of hydraulic diameter from 0.3 to 3.0 mm. The thin flat sheet membrane 1 in the sweep side may be sealed with a sweep sealing gasket 3. The sweep sealing gasket 3 may be made of durable materials, such as silicone, graphite, polymer composite, graphite composite, and/or soft metal. On the other side of the thin flat sheet membrane 1, there may be feed side flow channels 4. The feed side flow channels 4 are also preferably straight and of hydraulic diameter from 0.3 to 3.0 mm. The feed fluid side may be sealed by use of a feed side sealing gasket 5. The feed side sealing gasket 5 may be made of durable and compressible materials, such as silicone, graphite, polymer composite, graphite composite, and/or soft metal. The materials used to make the sweep side sealing gasket 3 and feed side sealing gasket 5 may be the same materials or may be different materials. The materials used to form the sweep side sealing gasket 3 and feed side sealing gasket 5 may be determined by respective fluid properties and operating conditions. To make the assembly process easier, one of the sweep side sealing gasket 3 or feed side sealing gasket 5 may be replaced by permanent welding or adhesion. There may be a sweep cover plate 6. On the sweep cover plate 6, there may be inlet and outlet ports 7 for providing an external sweep fluid to the sweep side flow channels 12 at two opposite ends of the membrane sheet 1 and there may be a group of bolt holes 8 arranged symmetrically. There may be a feed cover plate 9. On the feed cover plate 9, there may be feed fluid inlet and outlet ports 10 for connecting external feed fluid (not shown) to the feed side flow channels 4 at two opposite ends of the membrane sheet 1 and there may be a group of bolt holes 11 arranged symmetrically. The bolt holes 11 on the feed cover plate 9 match with the bolt holes 8 on the sweep plate 6 so that the device is completely sealed when pressure is applied through the sweep cover plate 6 and feed cover plate 9.

Figure 3B:
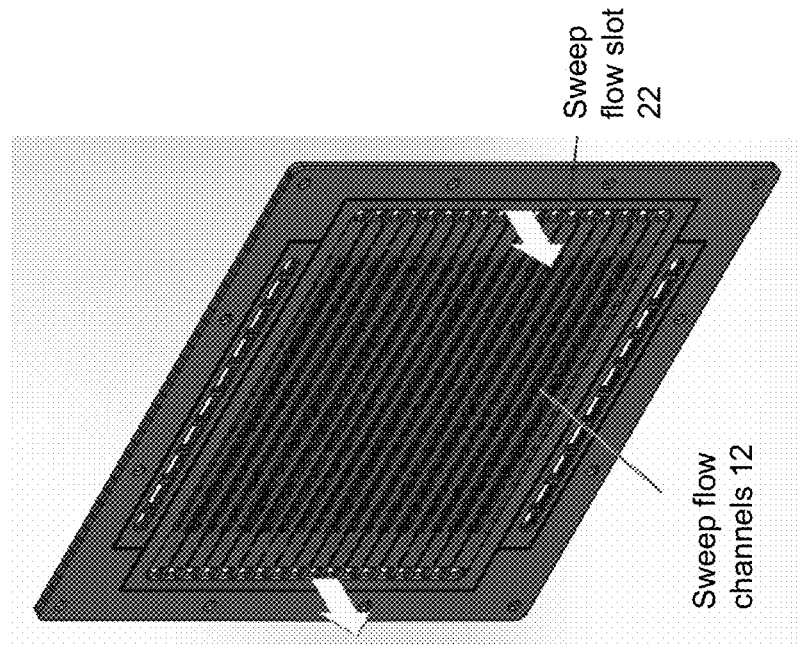
FIG. 3B is a perspective view illustrating the sweep side of the cassette half frame illustrated in FIG. 2A according to various embodiments.
Figure 3A:
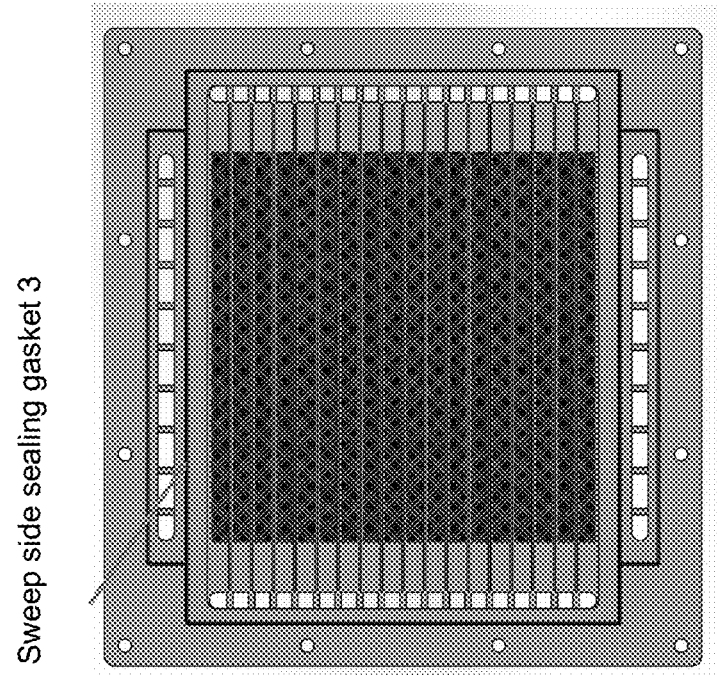
FIG. 3A a plan view of the sweep side of the cassette half frame illustrated in FIG. 2A according to various embodiments.

The membrane supporting structure 2 and sweep side flow channels 12 can be made into one plate, which may be referred to as a half cassette frame 20. FIGS. 2A and 2B illustrates a half membrane cassette frame 20 from feed side view. The half cassette frame 20 contains two feed flow slots 21 on the opposite sides to distribute the feed flow into the flow side feed channels 4. The half membrane cassette frame 20 also contains two sweep flow slots 22 at the opposite sides of the sheet membrane 1 to distribute the sweep flow into the sweep side flow channels 12 (FIGS. 3A and 3B). The half cassette frame 20 may contain a groove (not shown) for the feed side sealing gasket 5 to sit in. The feed side sealing gasket 5 isolates the sweep slot 22 from the feed flow slots 21 and feed side flow channels 4. The built-in membrane support structure 2 provides a smooth and flat surface for the thin flat sheet membrane 2 to sit on. FIG. 3 shows such a half membrane cassette frame 20 from sweep side view. The half membrane cassette frame 20 on the sweep side contains the groove (not shown) for the sweep side sealing gasket 3 to sit in. The sweep side sealing gasket 3 isolates the feed side flow slots 21 from the sweep side flow slots 22 and sweep flow channels 12.

Figure 4:
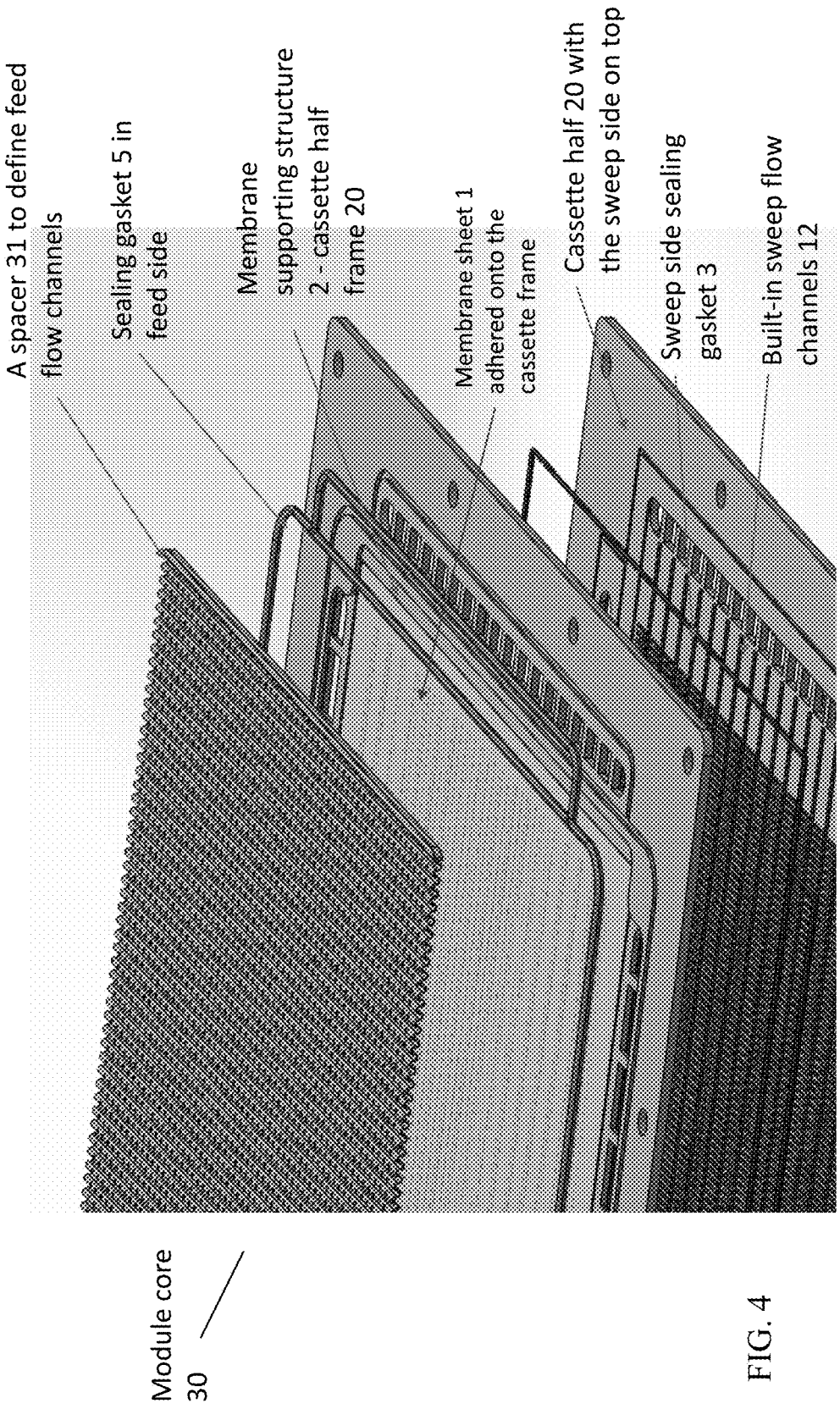
FIG. 4 is an exploded view illustrating stacking of multiple layers of feed/membrane/sweep components according to various embodiments.

Assembly of multiple membrane sheets 1 into a module core 30 is illustrated in FIG. 4 with the half cassette frame 20 shown in FIGS. 2-3. The modular core 30 contains the same basic components as shown in FIG. 1. The two cassette half frames 20 may be stacked by back-to-back, i.e., the sweep side facing the sweep side. The pattern can be repeated to a desirable number of the membrane sheets 1. The feed flow channels 4 can be formed by use of the feed side sealing gasket 5 as shown in FIG. 1. In FIG. 4, a feed channel spacer 31 may be placed inside the feed side sealing gasket 5 to form narrower feed flow channels 4.

Figure 5:
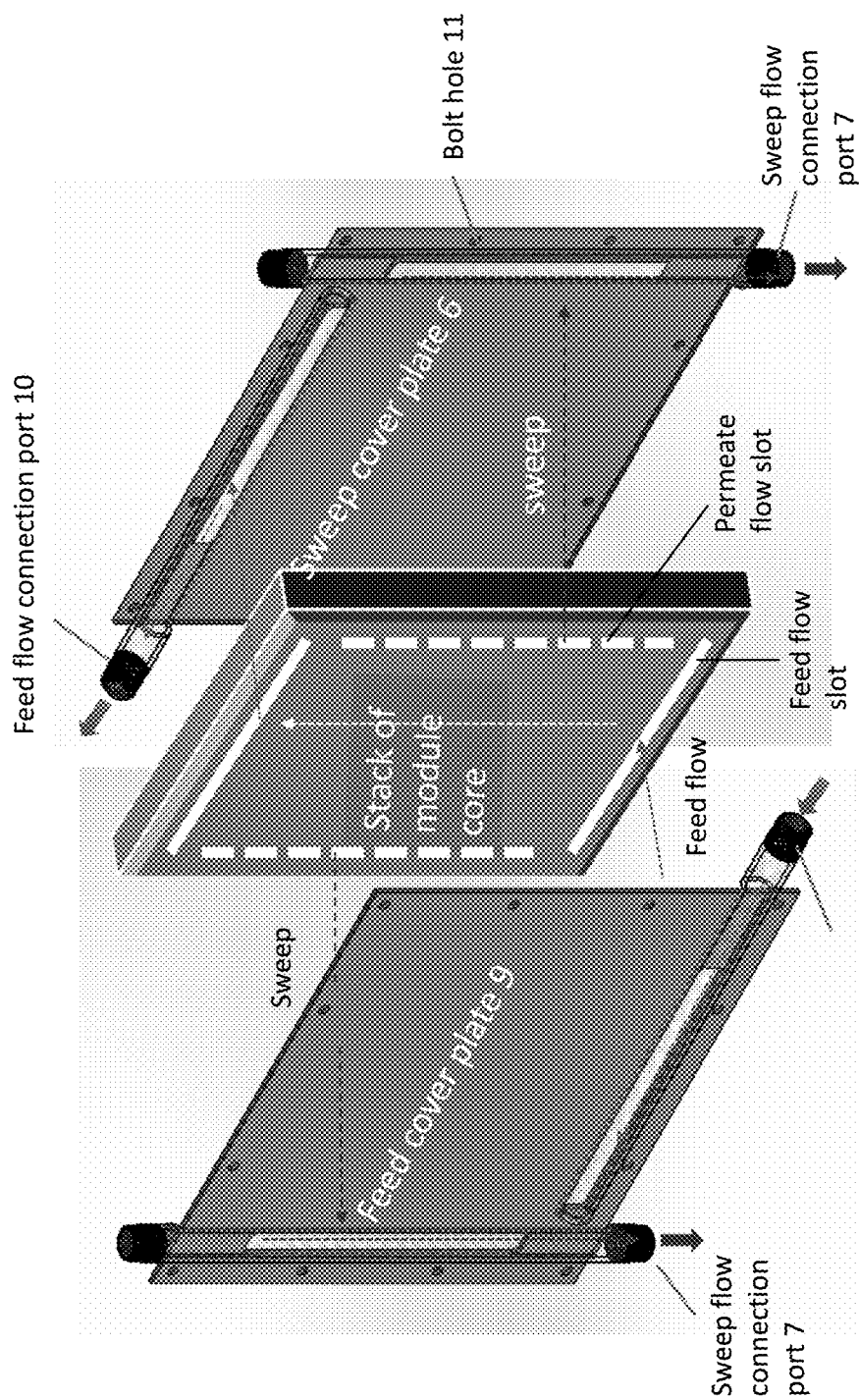
FIG. 5 is an exploded view illustrating attachment of cover plates containing feed and sweep connection ports to the structure illustrated in FIG. 4.

A working device comprising multiple membrane sheets 1 may be formed by placing the cover plates 6, 9 on the module core 30, as shown in FIG. 5. Different from FIG. 1, one feed and one sweep connection port each may be designed on the sweep cover plate 6 and feed cover plate 9. Through the feed inlet/outlet port 10, the feed flow may be provided into all the feed side flow slots 21 in the modular core 30 and may be distributed into the feed side flow channels 4 on each of the membrane sheets 1. Through the sweep inlet/outlet port 7, the sweep flow may be provided into all the sweep side flow slots 22 in the modular core 30 and may be distributed into the sweep side flow channels 12 on each of the membrane sheets 1. With the use of gasket sealing, to add, reduce or replace the membrane sheets in the device.

The membrane sheet 1 may be preferably a thin (20-200 µm) porous metal sheet and thin, porous ceramic membrane sheets. These membrane sheets 1 are hydrophilic and are stable in solvents and at high temperatures. Alternative membrane sheets may be water molecular-selective thin molecular sieve membrane.

Figure 6B:
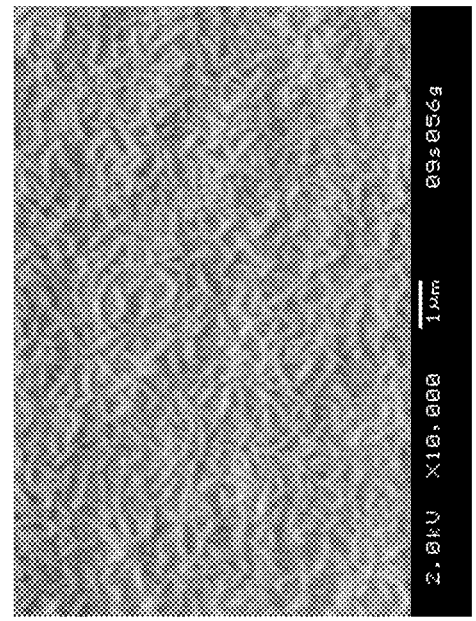
FIG. 6B is a scanning electron microscopy (SEM) micrograph of the PTFE-coated porous nickel membrane sheet illustrated in FIG. 6A according to various embodiments.
Figure 6A:
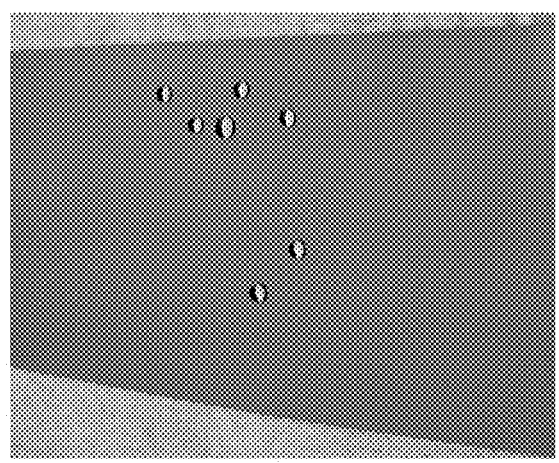
FIG. 6A is a photograph of a PTFE-coated porous nickel membrane sheet according to various embodiments.

A third membrane sheet 1 may be a thin, porous PTFE membrane. The thin membrane sheet 1 can be prepared by coating a thin, porous metal sheet with a hydrophobic porous PTFE layer. The PTFE loading may be about 0.1-0.35 mg/cm$^2$. The coating may be treated at 275-350° C. to form strong adhesion and porous structures. FIGS. 6A and 6B shows a PTFE-coated 50 µm-thin, porous nickel sheet. The coated surface may be superhydrophobic. Water droplets do not spread on the membrane surface, existing as nearly spherical droplets. The coating covers up porous metal sheet pores of 100 to 1000 nm. The coating layer pores are not visible under 10×SEM magnification (FIG. 6B), indicating that the pore size is at nanometer scale.

Figure 7:
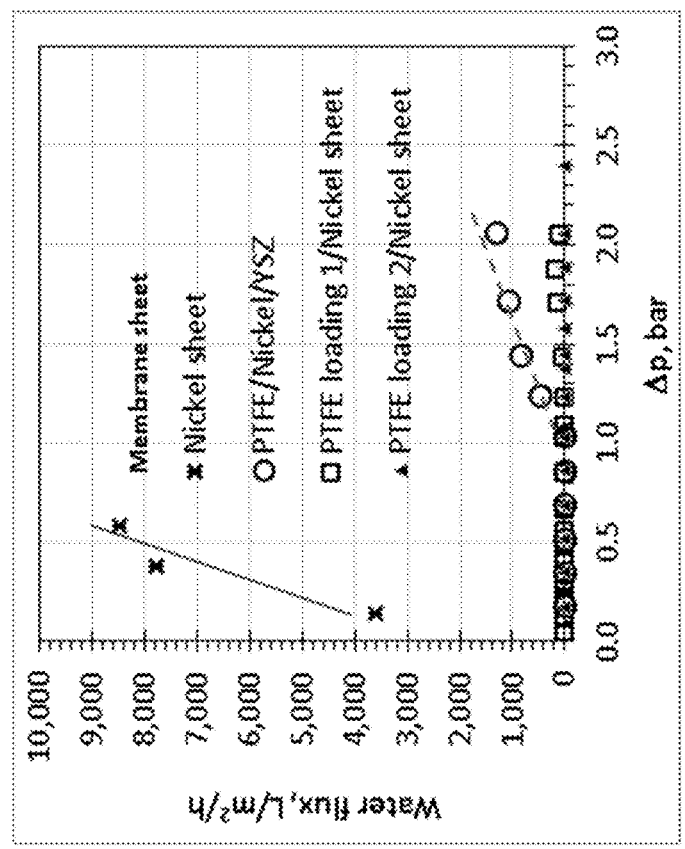
FIG. 7 is a plot of water breakthrough of the PTFE-coated metal sheets as a function of pressure according to various embodiments.

The hydrophobic membrane sheet 1 can be used to separate the water of aqueous solutions from gas or other fluids. Water breakthrough of the PTFE-coated membrane sheets 1 may be measured at 20° C. by gradually increasing the water pressure across the membrane. Sheet 1 The results are plotted in FIG. 7. For comparison, water permeation through a bare porous nickel sheet occurs at zero pressure differential across the membrane. Permeation breakthrough on the PTFE/Nickel/YSZ membrane sheet occurs at about pressure gradient=1 bar. No permeation breakthrough with the PTFE-coated Nickel sheet occurs within the pressure gradient tested (2.4 bar). The PTFE/Nickel/YSZ was prepared by coating the metal surface of a YSZ (Yttria-stabilized zirconia)-coated porous nickel sheet. The YSZ coating side is hydrophilic, while the PTFE coating side is hydrophobic.

These coated membrane sheets 1 remain highly permeable to gas as characterized by air permeance in Table 1. With 1 μm-thin PTFE coating, air permeance is reduced only slightly compared to the bare nickel sheet. As expected, the permeance is reduced by half with increasing the coating thickness to 2 μm. The PTFE/nickel/YSZ has the lowest permeance because of coatings on both surfaces.

TABLE 1

Air permeance of PTFE coated porous nickel sheet membranes (air conditions: 20° C., 22% RH)

|  | Ni sheet | PTFE loading 1 (~1 μm coat) | PTFE loading 2 (~2 μm coat) | PTFE/Ni/YSZ |
|---|---|---|---|---|
| Permeance, mol/m²/s/Pa | 2.4E−04 | 2.1E−04 | 1.0E−04 | 7.1E−05 |
| GPU | 716,418 | 626,866 | 298,507 | 211,940 |
| Breakup pressure, KPa | 0.44 | 0.70 | 0.85 | 1.50 |

YSZ = Yttria-stabilized zirconia

Figures 8A, 8B:
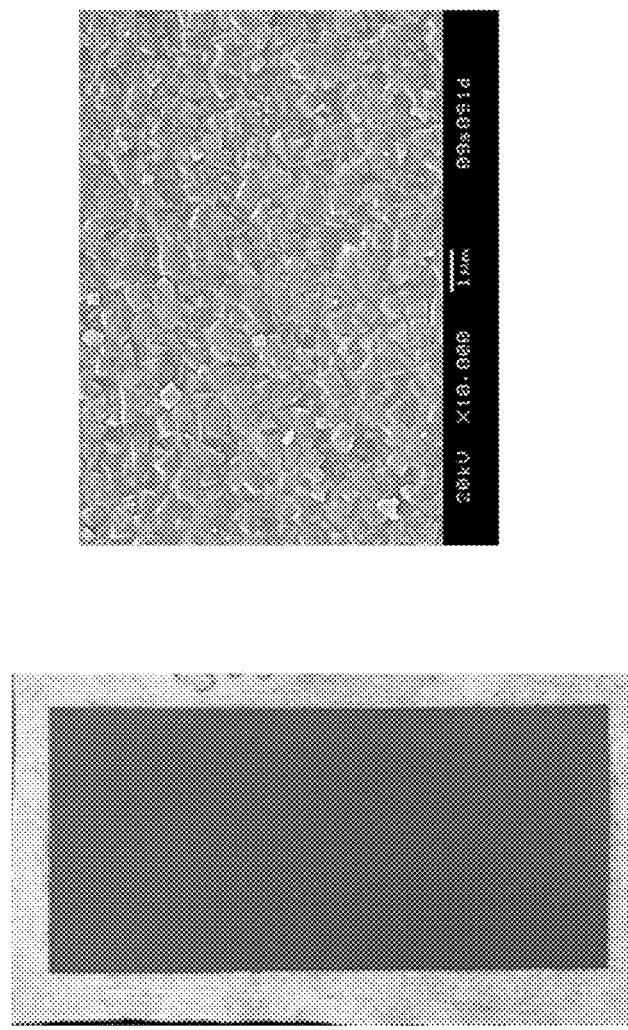
FIG. 8A is a photograph of a thin Silicalite/metal sheet membrane according to various embodiments.
FIG. 8B is a SEM micrograph of the thin Silicalite/metal sheet membrane illustrated in FIG. 8A according to various embodiments.

A fourth embodiment of membrane sheets includes a silicalite (MFI-type) membrane grown on the thin, porous metal sheet as shown in FIGS. 8A and 8B. At zeolite coating level of 0.5 to 1.0 mg/cm², the zeolite membrane looks like a metal sheet, flat and flexible to coil. This membrane sheet 1 is activated by heating in hydrogen at 400° C. The silicalite membrane is hydrophobic. The micropores (~0.5 nm) are typically not plugged by water vapor condensation or adsorption. This membrane sheet 1 only allows certain molecules go through while blocking fluid flows. The membrane has $CO_2$ permeance of about $1.0 \times 10^{-6}$ mol/(m²·s·Pa). If the feed side of the membrane is injected with a solution of 75% isopropanol (IPA) in water containing green food color, the membrane sheet 1 blocks permeation of both the color molecule and IPA solution at 0.7 bar tested. If the feed side of the membrane sheet 1 is injected with 1 M KOH solution at 1.0 bar, no liquid permeation occurs either.

Broad applications of the device of this invention are illustrated by the following example.

Figure 9:
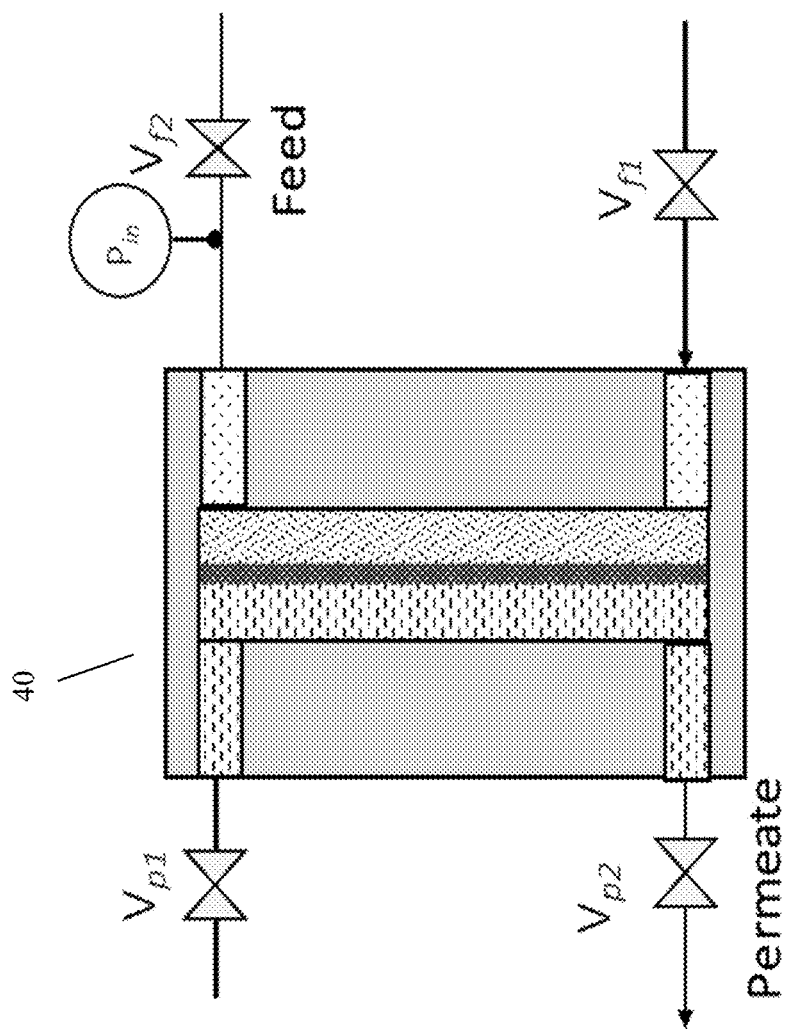
FIG. 9 is a vertical cross sectional view of a device configured for fluid inline filtration according to various embodiments.

Example I: Filtration for Online Removal of Fine Particulates from Process Stream A device loaded with one membrane sheet 1 (FIG. 9), which is assembled as illustrated in FIG. 1, can be utilized for online filtration of fine particulates from different fluid streams—liquid (water, solvent, or oil, mixtures thereof) and from gases. Typically, any thin flat membrane 1 of 0.05-0.7 mm may be placed within the seating cavity on the sweep cover plate 6 and used depending on the application. In most of the tests shown here, a microporous nickel membrane ~50 micron thick was used along with a polycarbonate cell 40. In applications involving prolonged exposure to temperatures above 60° C. or depending on chemical compatibility, a completely stainless-steel cell 40 was used. For particulates below 100 nm, YSZ ceramic coated microporous sheet membranes 1 were used. In these cases, the ceramic side is always placed facing the feed side of the cell 40. When used at higher temperatures, the inner silicone feed side sealing gasket 5 was typically replaced with graphite to prevent damage to the membrane 1 due to excessive expansion of the silicone when heated. For filtration of either chemically and/or thermally challenging liquids, a stainless-steel cell 40 with graphite feed side gaskets 5 may be used. For filtration of hot oils or waxes, oil and thermally stable microporous nickel membrane 1 was used. Either through-flow or cross flow configurations may be used.

Liquid filtration. In typical liquid filtration configuration, the cell 40 may be oriented vertically so that liquid enters the bottom port of the feed side and exits at the top feed fluid outlet/inlet port 7. The vertical orientation ensures removal of any trapped gas within the feed side and maximizes membrane utilization. The cell 40 can still be used horizontally oriented for liquid filtration so long as the cell 40 is initially vertically oriented briefly until trapped gas has been removed. The cell 40 can then be operated horizontally, with the permeate side facing the bottom. In gas filtration, the device orientation is less significant, and the device may be positioned, as necessary.

During filtration, it is typical to provide valves at all four ports 7, 10 of the cell 40. A pressure gauge may be recommended for the feed side to monitor the process and prevent membrane damage from excessive pressure. For flow-through mode, the outlet of the feed side may be closed with the valve $V_{f2}$ or cap so that the fluid may be forced to flow through the pores of the membrane 1. Particulates larger than the pore size of the membrane 1 in use may be trapped on the membrane surface. Permeate can be collected out of $V_{p2}$. In a crossflow configuration, the valve $V_{f2}$ is throttled, or a dedicated throttling valve may be provided to restrict the outflow of feed solution which is continuously circulated in and out of a feed reservoir (not shown). Building a pressure gradient across the membrane 1 drives the filtration. This mode offers continuous operation and is especially useful for concentrating dilute feed solutions. As the liquid circulates through the cell 40, a portion of the liquid permeates through the membrane 1 and returning the particulates back to the reservoir. Some small amounts of particulates may accumulate on the membrane surface as well, which may be recovered later.

As illustrated in FIGS. 10A-10C, feed liquid may be introduced to the feed side using an appropriate pump 41, gravity fed by providing a reservoir 42 at a higher elevation from the feed inlet port 10, or for particularly small volumes, a syringe 43 may be used. The permeate side may operate under atmospheric pressure, or at lower pressures by pulling vacuum using an appropriate vacuum pump 44. When operating with a vacuum pump 44 on the permeate side, the feed outlet port 10 and one of the sweep ports 7 are kept closed. Liquid filtration or concentration can thus begin and be stopped when entire solution has been filtered or adequately concentrated. Depending on the membrane 1 being employed, the filtration may be stopped when feed pressure exceeds the membrane's safe working limit, for example 15 psi. The cell 40 can then be cleaned in-situ, if applicable, or easily opened for cleaning. The particulates accumulated on the membrane surface can be recovered using a soft but firm scrapping tool, such as a 3 mm thick silicone piece. The membrane 1 may also be washed with appropriate cleaning liquid to restore original performance. However, if the feed pressure or flux remains low after cleaning, the membrane 1 should be replaced.

Backflush.—In-situ cleaning can be done with a backflushing procedure. In typical operation, the feed side liquid (water, feed solution, or application specific fluid) may be allowed to flow with no pressure. The cleaning liquid used in backflush on the sweep side and feed side may be the permeate of the solution being filtered, clean tap or deionized water, or some other application specific cleaning fluid. The outlet valve of the sweep side may be kept closed and pressurized cleaning liquid may be forced into the sweep side in short pulses. The fluid may be pressurized with compressed air or a liquid pump. The pulses may range from 1-5 sec. The pressure used may depend on the membrane 1 and cleaning protocol. It should not exceed the membrane 1 or device limits, whichever is lower. Care should be taken to keep the pressure level below acceptable range of the membrane 1 in use.

In another method, the sweep side (permeate side, in this application) outlet valve $V_{p1}$ may be replaced by a small water reservoir (Not shown) in the form of a tube or any such apparatus with a capacity of 5-10 ml. For this method of cleaning, the feed outlet port 10 and the permeate outlet port 7 are closed. As liquid keeps feeding into the cell 40, cell 40 pressure may be allowed to slowly build. Reducing flow rates may prevent damage to the membrane 1. As the pressure builds, permeate collects in the sweep side, filling the liquid reservoir 45. Once desired cleaning pressure is reached, the feed outlet valve $V_{f2}$ may be opened quickly. The pressurized sweep side liquid rushes out though the membrane 1 and out into the feed side, performing a backflush function, removing trapped particulates from within the pores, thus regenerating the membrane 1. The process is repeated multiple times until desired cleaning is achieved. The advantage of this configuration is that no extraneous pressurization source is necessary for the backflush process. The cleaning fluid may be the permeate of the feed and the pressure may be generated by the feed pump 41. This may greatly simplify the entire setup.

Gas filtration. The setup essentially remains the same as previously described. The cell 40 can be oriented as desired. Typically, the gas filtration will work in a flow-through configuration, where the feed outlet port 10 may be kept closed, forcing the gas through the membrane 1 where it gets filtered before exiting the sweep side.

Example II. Humidity Exchange

Figure 11:
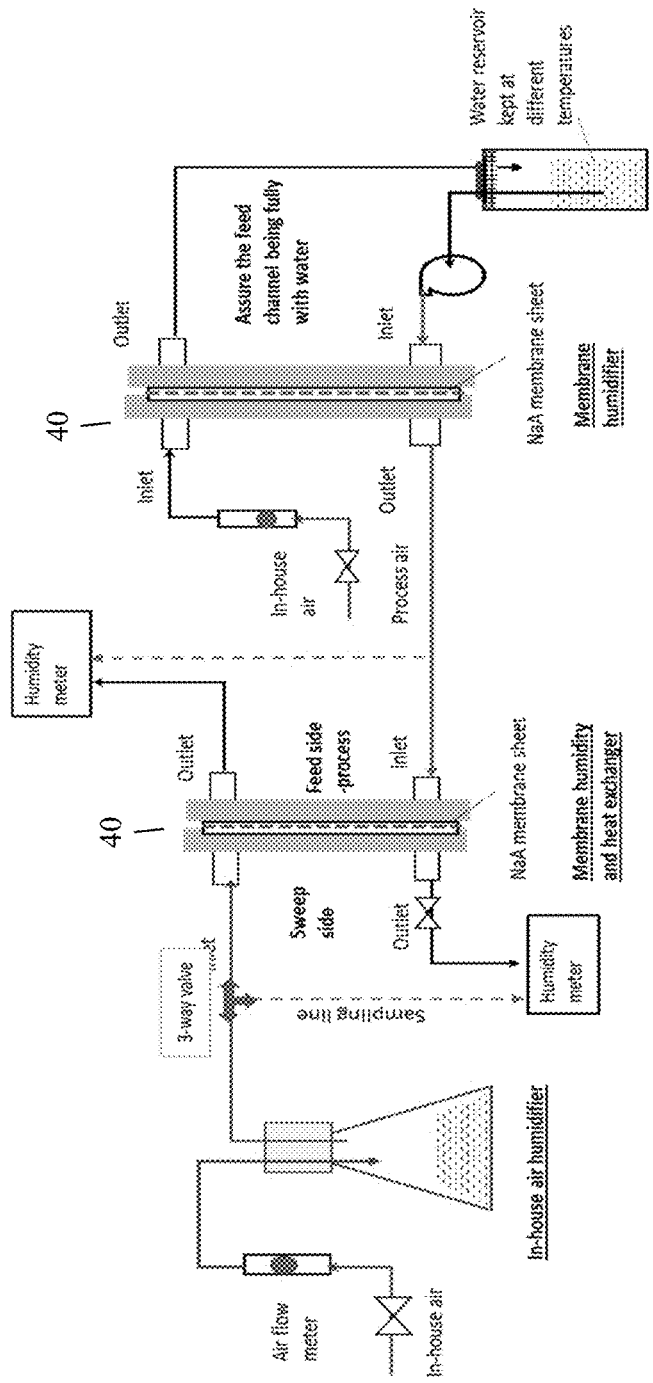
FIG. 11 is a schematic illustration of a process flow of a device setup for transfer of water vapor according to various embodiments.

For humidity and thermal exchange, the polycarbonate version of the device can be used (FIG. 11). It may be placed in any orientation. Ideally, the device should be placed in such a way that any condensation occurring due to high humidity can flow out of the cell 40 easily. The cell 40 may be assembled with a thin NaA zeolite membrane coated microporous nickel sheet. The cell 40 should be assembled such that the zeolite coating is facing the feed side of the cell 40. Humidified process air at different temperatures may be provided from using another cell 40 configured as a humidifier. That application is discussed in detail in Example 3. The humid process air may be flowed through the feed side of the device configured as a humidity and enthalpy exchanger. Humid house air at RH ~40-50% may be swept through the sweep side at a range of flow rate from 0.5-7.5 NL/min to study the humidity and thermal exchange of the cell 40. Relative humidity (RH) and temperature of the gases may be measured at the cell 40 outlets at steady state conditions.

Example III. Membrane Humidifier

Figure 12:
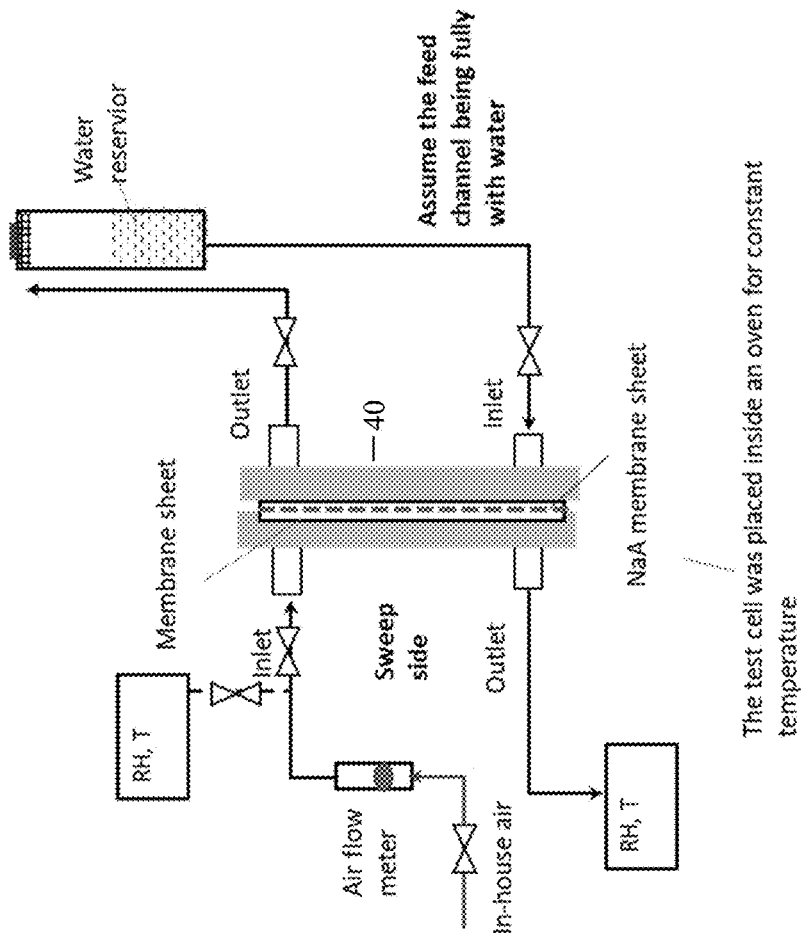
FIG. 12 is a schematic illustration of a device setup for membrane humidification using a gravity water feed according to various embodiments.

FIG. 12 shows humidification of process gas using static water. In this example, static water on the feed side is used as the water source. A thin NaA zeolite coated microporous nickel membrane 1 may be used for this application, with the zeolite side always facing the feed. This membrane 1 selectively allows only water vapor permeation. The water for humidification may be fed to the cell 40 using gravity. The feed source may be kept elevated above the lower port of the cell 40. The cell 40 is kept vertically oriented and water enters the cell 40 at the bottom port 10. The water is fed either on the feed side or the sweep side, so it contacts either the zeolite or nickel side. Slight variation in performance is seen depending on the side the liquid water contacts. Care is taken to visually ensure there is no trapped gas on the water side. Gas to be humidified is flowed through the side that does not contain water. The test cell 40 was placed within an oven to maintain a controlled environment. In typical application, the oven is not necessary. Steady-state RH and temperature were measured.

Figure 13:
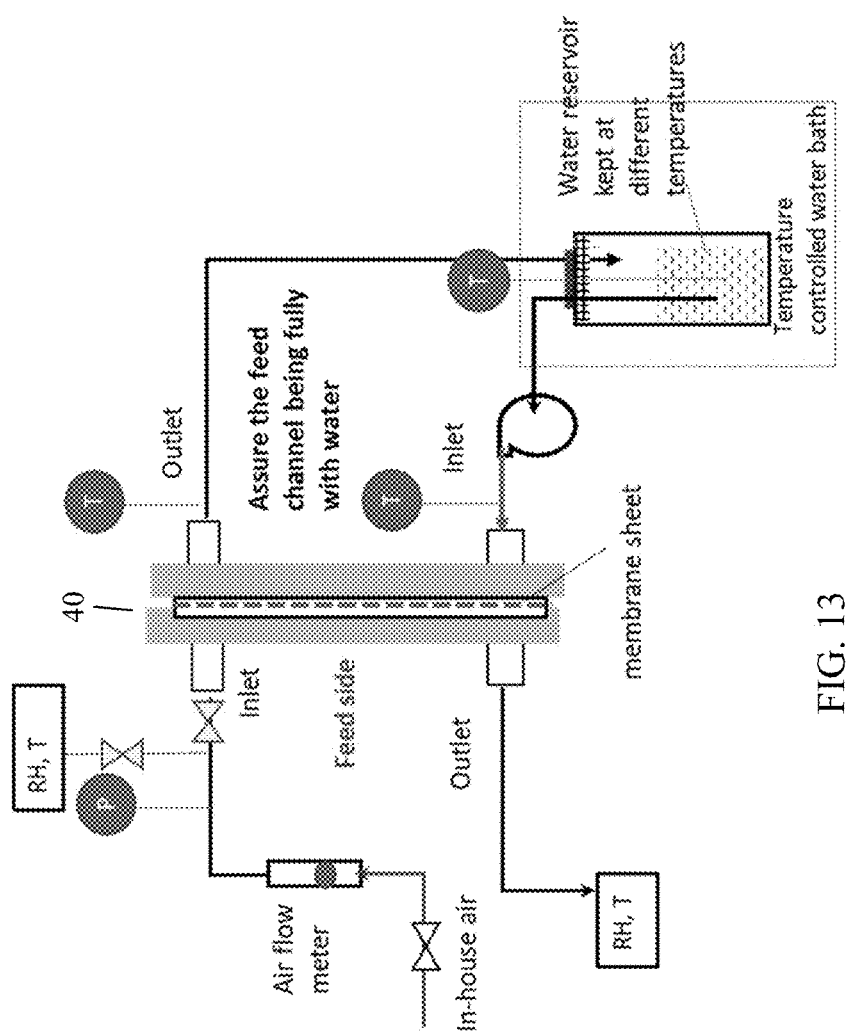
FIG. 13 is a schematic illustration of a setup for humidification of in-house air at different temperatures according to various embodiments.

The device allows humidification of process gas at different temperatures using running water (FIG. 13). Either a NaA zeolite coated nickel membrane or PTFE thin film coated membrane are used for this application. Typically, the PTFE loading was 0.125 mg/cm² for PTFE coated Ni membrane. The cell 40 was kept vertically oriented. A temperature-controlled water bath was used to provide water at different temperatures (25, 45, 60° C.). Tap water was used for this application. Water from the bath was constantly pumped into the cell 40 at the bottom port of the sweep side and returned to the hot water bath through the upper port. Note that the liquid was flowed through the sweep side, facing the nickel side of the membrane 1. Gas to be humidified is flowed through the feed side. The selective membrane 1 prevents liquid water crossover into the feed side gas and primarily water vapor diffuses across the membrane 1, humidifying and heating the gas stream. RH and temperature are measured at steady state. Typically, the gas flow was counter current to the water flow. RH and T were measured at steady state. This also helps quickly remove any condensate if any from the feed side.

Example IV. Membrane De-Humidifier

Figure 14:
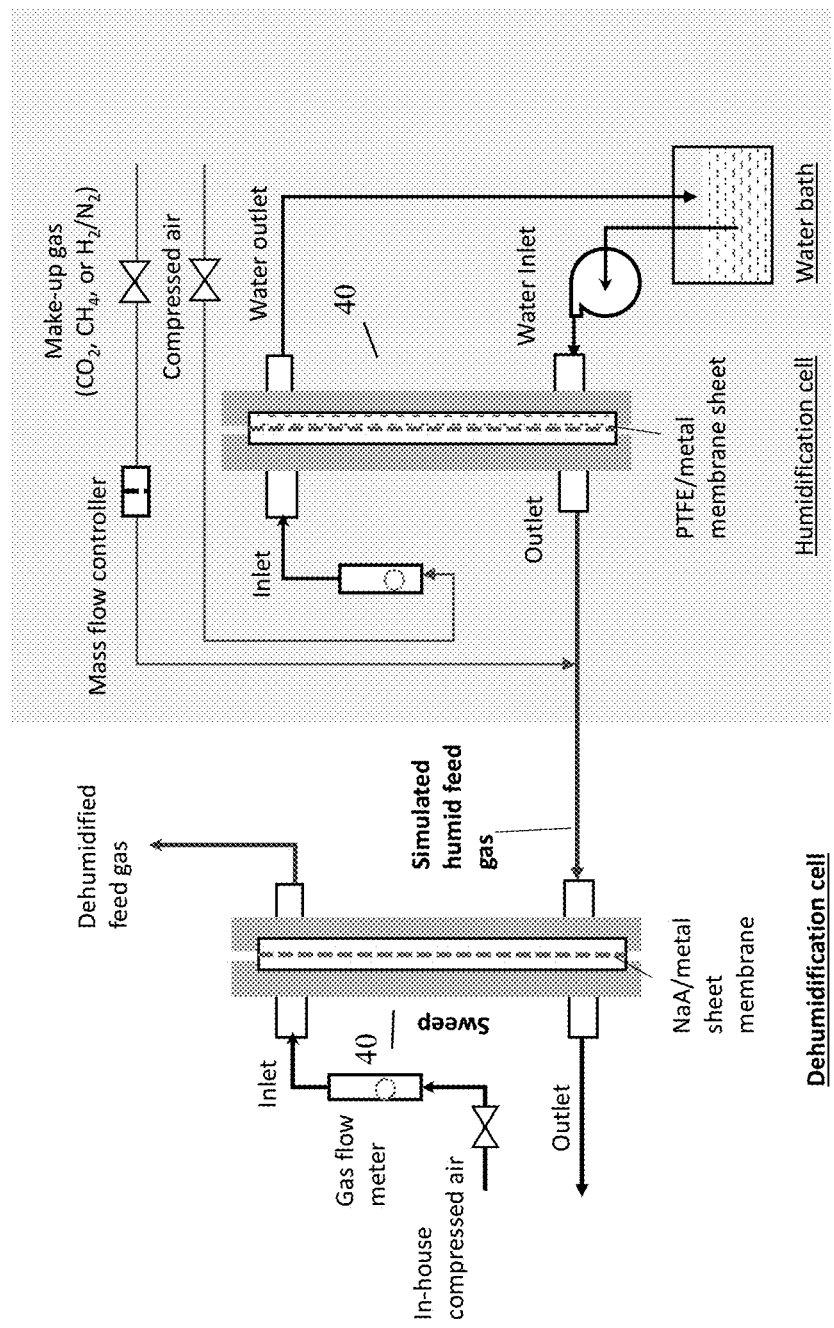
FIG. 14 is a schematic illustration of a setup for dehumidification of process air using air sweep (mode 1) according to various embodiments.

The device is used for de-humidification of process gas using in-house air sweep (FIG. 14). A water vapor selective NaA zeolite coated nickel membrane is used for this application. The zeolite side is always assembled facing the feed side. The cell 40 may be oriented in any way. In Mode 1, a sweep gas, compressed in-house air (~20% RH, room temperature) is used on the sweep side of the cell 40 to perform the dehumidification. Hot humid process air is generated for the purposes of the demonstration using another device configured as a humidifier (described in Example 3). Additional marker molecules such as $CH_4$, $CO_2$ may be introduced to the air stream to verify the water vapor selectivity of the membrane 1. The humid gas at different temperature and humidity levels may feed into the cell 40, where water vapor selectively permeates across the membrane while all other molecules remain in the process air stream. The sweep gas stream may carry away the moisture out of the cell 40 as soon as it diffuses across. Temperature and RH were measured at steady state.

Figure 15:
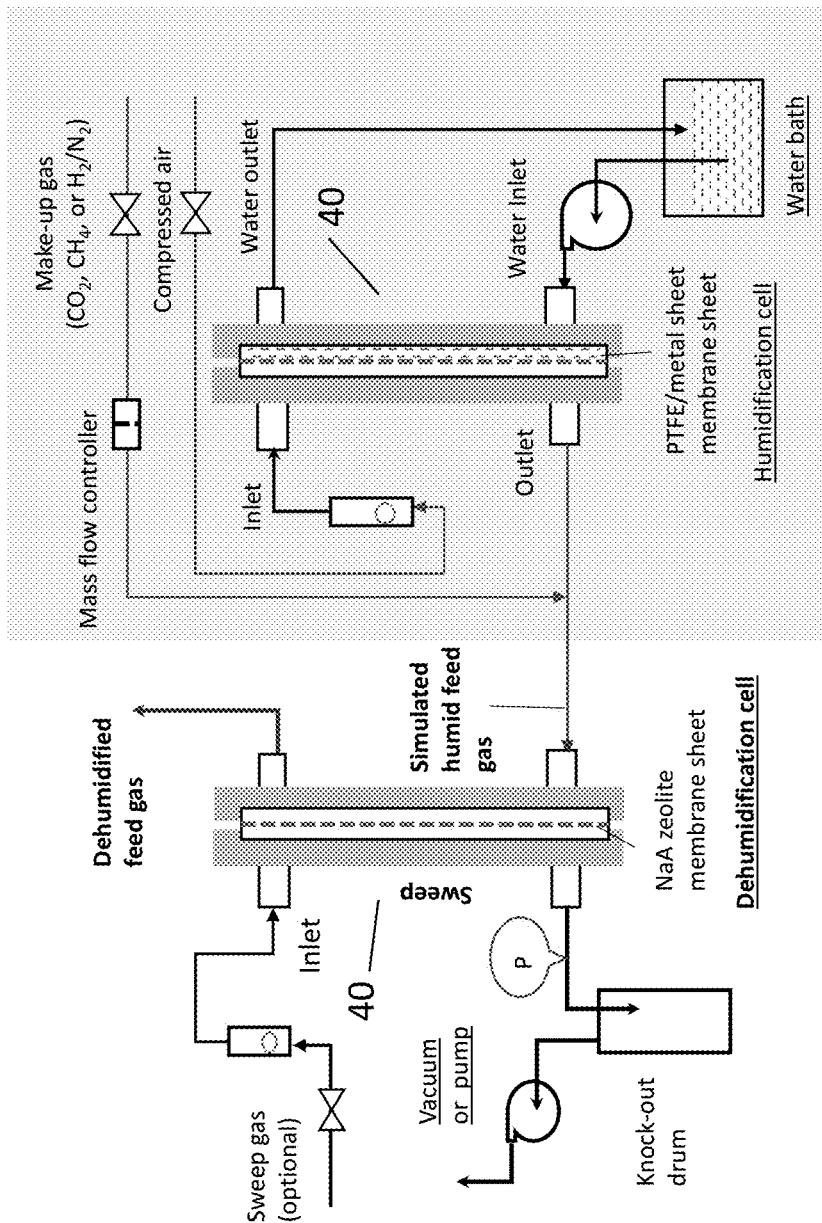
FIG. 15 is a schematic illustration of a setup for membrane dehumidification using vacuum or air pump (modes 2 and 3) according to various embodiments.

The device enables other dehumidification operation mode (FIG. 15): mode 2 by pulling vacuum on the sweep side and mode 3 using an air pump on the sweep side. The remaining setup remains like the Mode #1 operation, using sweep gas, except one of the sweep side ports 7 may be kept closed and the lower port may be connected to the vacuum pump 44. Humid process gas passes through the feed side of the device, while the vacuum pulled on the sweep side effects selective water vapor diffusion across the membrane 1 and dehumidification. A small amount of air may be bled through the other sweep port 7 to assist the process.

Using a similar setup as Mode 2, a small air pump may be connected to the sweep outlet port and the sweep inlet port left open to allow air to enter the sweep side continuously as the pump operates. In this mode of operation, air sweep can be generated on the sweep side depending on the capacity of the pump or amount of throttling of the inlet, leading to dehumidification and humidity control, similar to the first two mode of operation.

Figure 16:
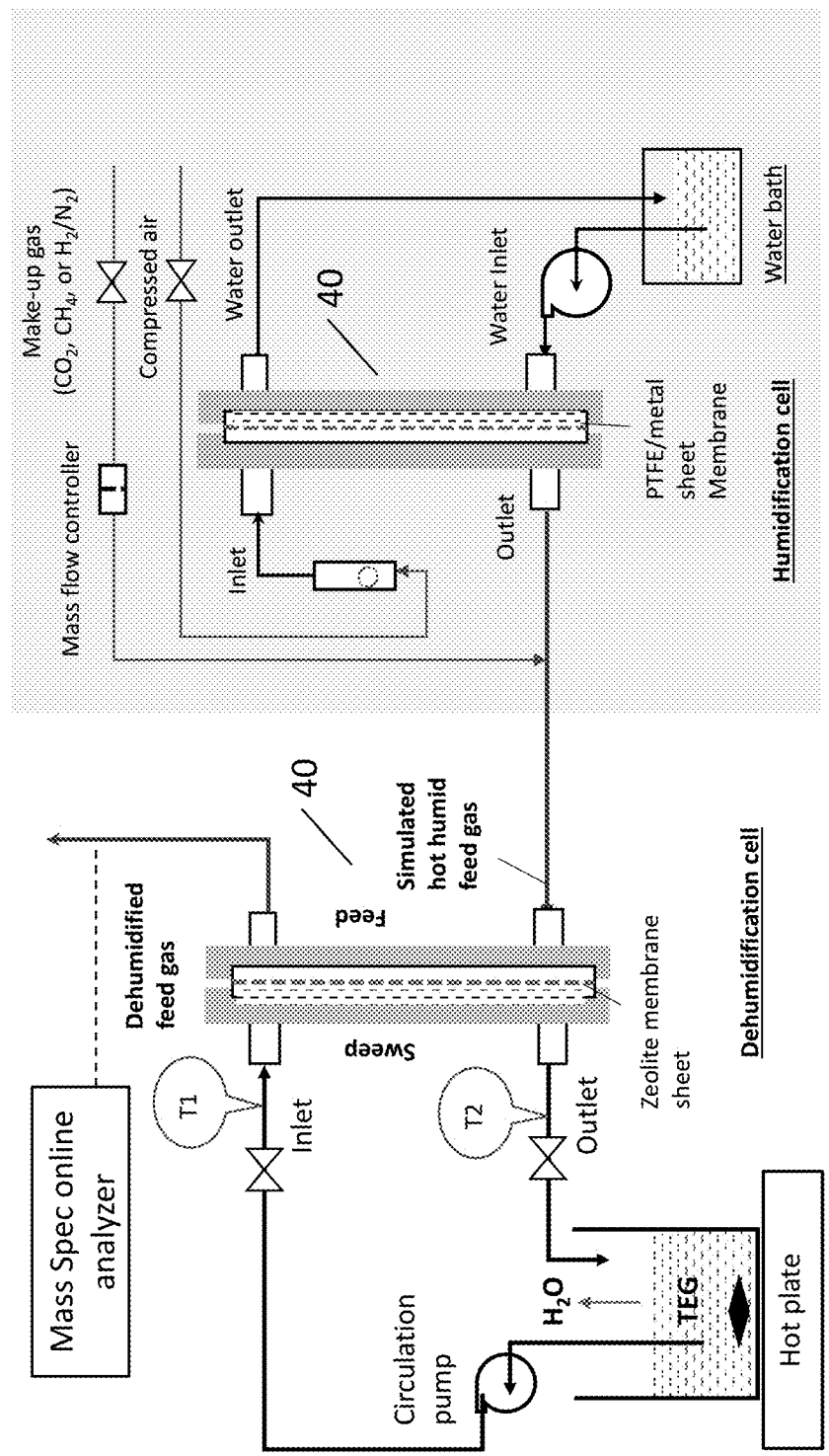
FIG. 16 is a schematic illustration of a setup for membrane dehumidification using a liquid desiccant (mode 4) according to various embodiments.

The device enables de-humidification of process gas using a liquid desiccant on the sweep side (mode 4). As shown in FIG. 16, another mode of operation may be performed by circulating a liquid desiccant on the sweep side to dehumidify the process gas stream. The remaining device setup remains similar to the Mode 2, except both sweep side ports 7 remain open to allow continuous circulation of liquid desiccant, (triethylene glycol) through the sweep side of the cell 40. A hot plate or heating apparatus may be provided close to the outlet of the sweep side to quickly heat the liquid desiccant up to ~65° C. to help expel the captured moisture and regenerate it. The liquid desiccant in the reservoir may be kept constantly stirred. A few feet of copper tubing may be provided between the desiccant liquid pump and the sweep inlet so that the regenerated desiccant is cooled down to near room temperature prior to reentering the cell 40. Humid process gas passes through the feed side of the device, while the liquid desiccant being circulated at different rates pulls the water vapor diffusing across the selective membrane 1 and returns to the reservoir where it is regenerated.

Example V. Membrane Contactor for $CO_2$ Capture

Figure 17:
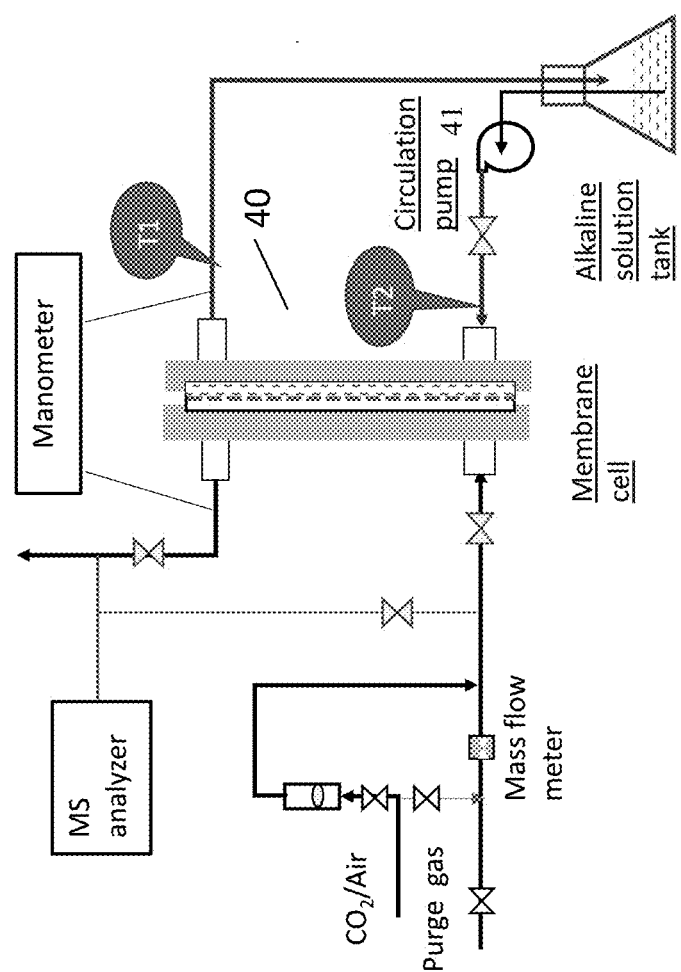
FIG. 17 is a schematic illustration of a setup used for $CO_2$ gas absorption into alkaline solution according to various embodiments.

Example of using the device for absorption of $CO_2$ gas with a liquid sorbent is illustrated in FIG. 17. A 5 cm×11 cm PTFE-coated porous nickel sheet of about 50 μm thickness was loaded into the device. The PTFE loading is 0.25 mg/cm² may be used for this application. Air may be introduced to the feed side, while an alkaline liquid is circulated on the sweep side via a pump 41. The liquid contacts the metal side (facing the feed side) while the gas stream contacts the PTFE surface. This membrane configuration prevents the air and liquid from crossover. In-house compressed air (20° C., 40% RH) blended with different $CO_2$ concentrations was used. The $CO_2$ capture reactivity may be characterized by an overall first order rate constant, which may be calculated by use of the following equation:

$$\frac{C}{C_0} = \exp\left(-k_{app}\frac{z}{U}\right)$$

Where $C_0=CO_2$ concentration at entrance of the reactor, mol/m³; $C=CO_2$ concentration at the reactor flow length z, mole/m³; $k_{app}$=apparent rate constant, 1/s; U=gas velocity in the membrane gas channel, m/s; z=the reactor flow length, m.

Figure 18B:
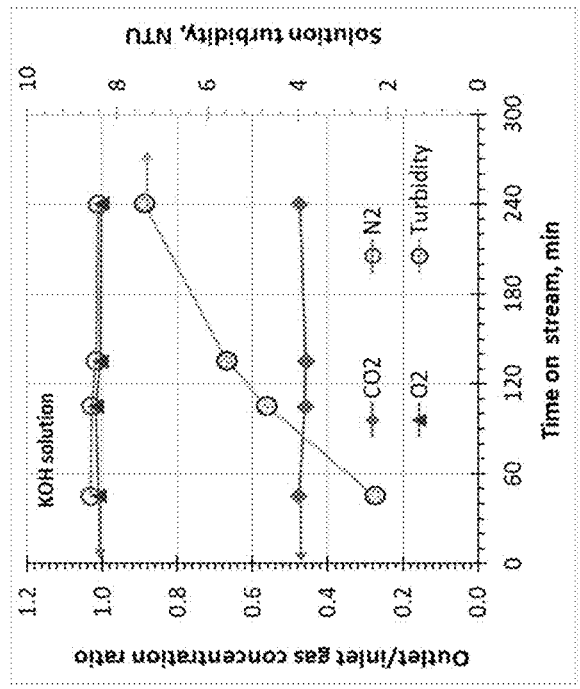
FIG. 18B is a plot of $CO_2$ outlet/inlet gas concentration ratio by alkaline solution as a function of time according to various embodiments.
Figure 18A:
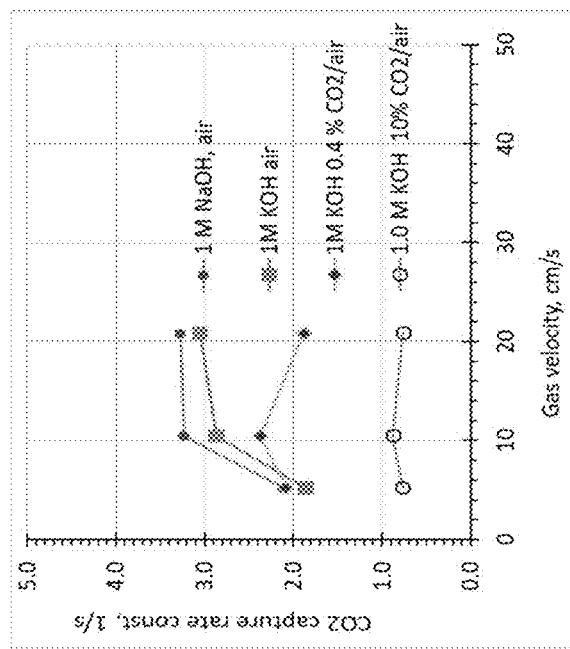
FIG. 18A is a plot of $CO_2$ gas absorption by alkaline solution at different gas velocity conditions according to various embodiments.

FIG. 18A shows that the $CO_2$ capturing rate constant may not be affected when air velocity inside the channel is above a certain value, such as 10 cm/s, while the liquid velocity is kept constant at 0.7 cm/s. Comparative tests with the in-house air loaded with different concentrations of $CO_2$ indicate that the rate constant for direct air capture (DAC) may be about 2-3 times higher than that for capturing $CO_2$ of concentrations at the flue gas level (~10%). The activity of 1.0 M NaOH is comparable to that of 1.0 M KOH.

FIG. 18B shows the absorption or capture performance of $CO_2$ from air into 1.0 M KOH solution with time on stream under constant conditions: gas velocity=20.8 cm/s, liquid velocity=0.7 cm/s, feed gas temperature=21° C., pressure differential across the membrane=75 cm of $H_2O$. The $CO_2$ capturing rate in the membrane contactor may be rapid. As shown in FIG. 18b, about 53% of $CO_2$ was captured from air at an air residence time inside the G/L contracting channel of about 0.5s. Outlet concentrations of $N_2$ and $O_2$ were about the same as the inlet, suggesting negligible absorption of the air into the solution. As expected, potassium bicarbonate particulate was gradually formed as the reaction went on. The particulate was small enough that it was suspended in the solution. The content can be assessed by measuring the turbidity of the solution (NTU). FIG. 18B shows gradual increase of the solution turbidity with reaction time on stream, indicating accumulation of the solid.

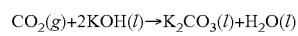

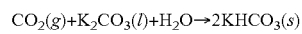

$KHCO_3$ solubility in water at 20° C. is 24 g/liter and is 50 times less than $K_2CO_3$ solubility. Thus, $KHCO_3$ can be precipitated as solid from the alkaline solution. Bicarbonate decomposition is commonly used as baking powder in food preparation. $CO_2$ gas may be produced by decomposition of $KHCO_3$:

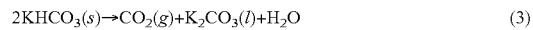
(3)

Figure 19B:
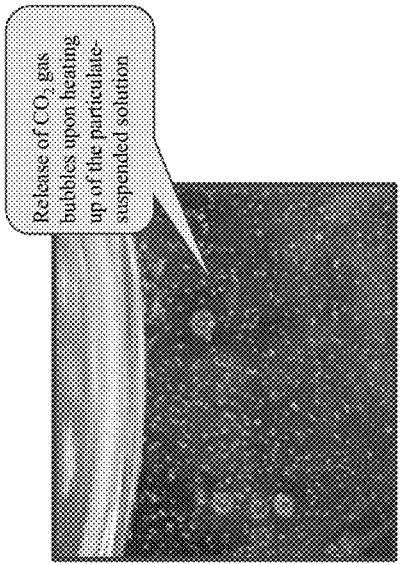
FIG. 19B is a photograph of illustrating the decomposition of bicarbonate solution into $CO_2$ gas by heating according to various embodiments.
Figure 19A:
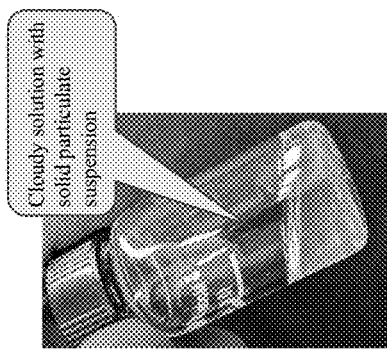
FIG. 19A is a photograph of illustrating the regeneration of a reacted potassium carbonate solution by heating according to various embodiments.

FIG. 19A shows that the reacted alkaline solution looks cloudy due presence of potassium bicarbonate. The reacted solution was heated in an oven. When the temperature reached about 60-65° C., $CO_2$ gas bubbles emerged due to decomposition of the bicarbonate.

Figure 20:
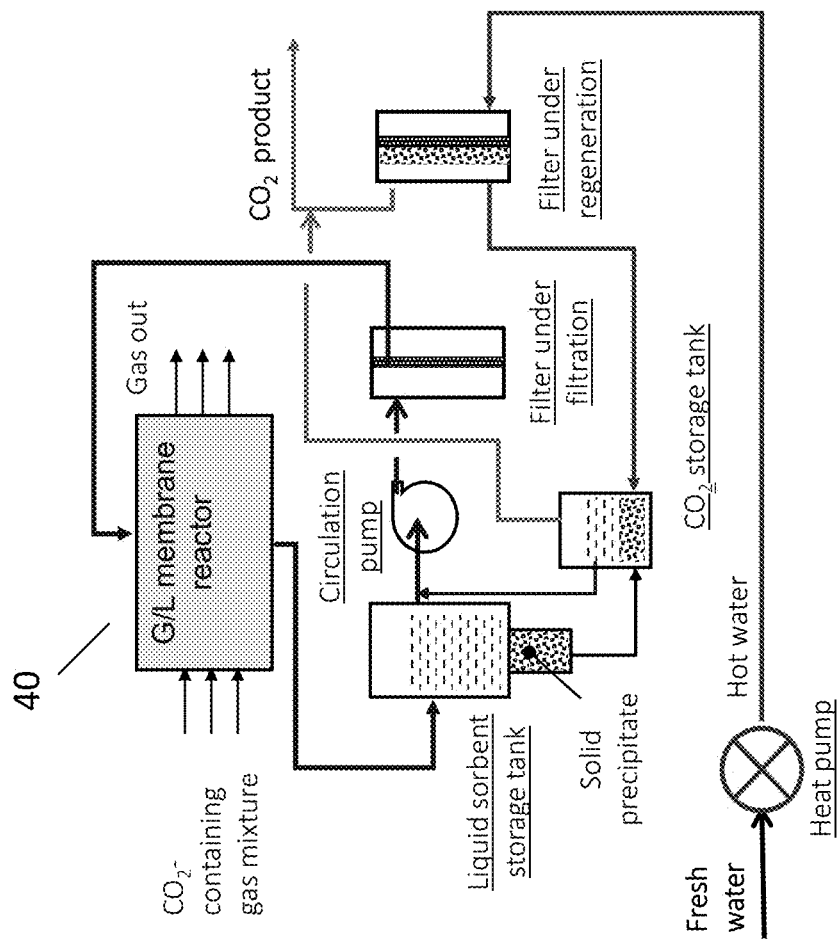
FIG. 20 is a schematic illustration of $CO_2$ capture from a gas mixture using a gas/liquid membrane contactor according to various embodiments.

With the high $CO_2$ capture reaction activity and low regeneration temperature of the reacted solution, the gas/liquid membrane contactor (or reactor) enables a simple $CO_2$ capture process as shown in FIG. 20. $CO_2$-containing gas flow may be introduced into the feed channel of the membrane module. The alkaline solution as potassium carbonate may be circulated on the sweep side of the membrane channel. Inside the membrane module, $CO_2$ from air diffuses across the membrane and reacts with potassium carbonate to form potassium bicarbonate. Since solubility of potassium bicarbonate in water at 20° C. is only 24 g/liter and 50 times less than the carbonate solubility, the bicarbonate precipitates into solid in the storage tank. The solution temperature may be maintained below 80° C., preferably below 40° C. Some additives, such as amines and glycol, may be added into the solution to enhance its reactivity and/or operating window. The operating pressures for both gas and liquid are preferred at low pressures such as less than 3 bar. The pressure difference between the gas and liquid sides is preferably less than 1.0 bar.

To avoid possible membrane channel fouling by the particulate, the clarified solution may be drawn out of the storage tank and filtered using Molecule Works porous nickel sheet membrane before being fed into the membrane module. The nickel membrane filter 1 shows high flux for filtration of this type of solution, 1000-5000 liter/m²/h. Once the particulate is accumulated on the filter, the filter may be switched to regeneration by introducing hot water to heat up the filter and cause decomposition of the bicarbonate particulate. Meanwhile, the bicarbonate solid collected from the storage tank may also be heated to decomposition. $CO_2$ gas released from the regeneration is recovered as the product, while the carbonate and water are recycled to the feed solution. Heat exchangers, which are not shown in the process flow, can be used to control the recycle liquid fluid temperature.

Regeneration is preferably conducted at temperatures less than 100° C. that low grade heat or heat pump can be used to supply the regeneration heat.

Example VI. Membrane Contactor for Ammonia Absorption

Figure 21:
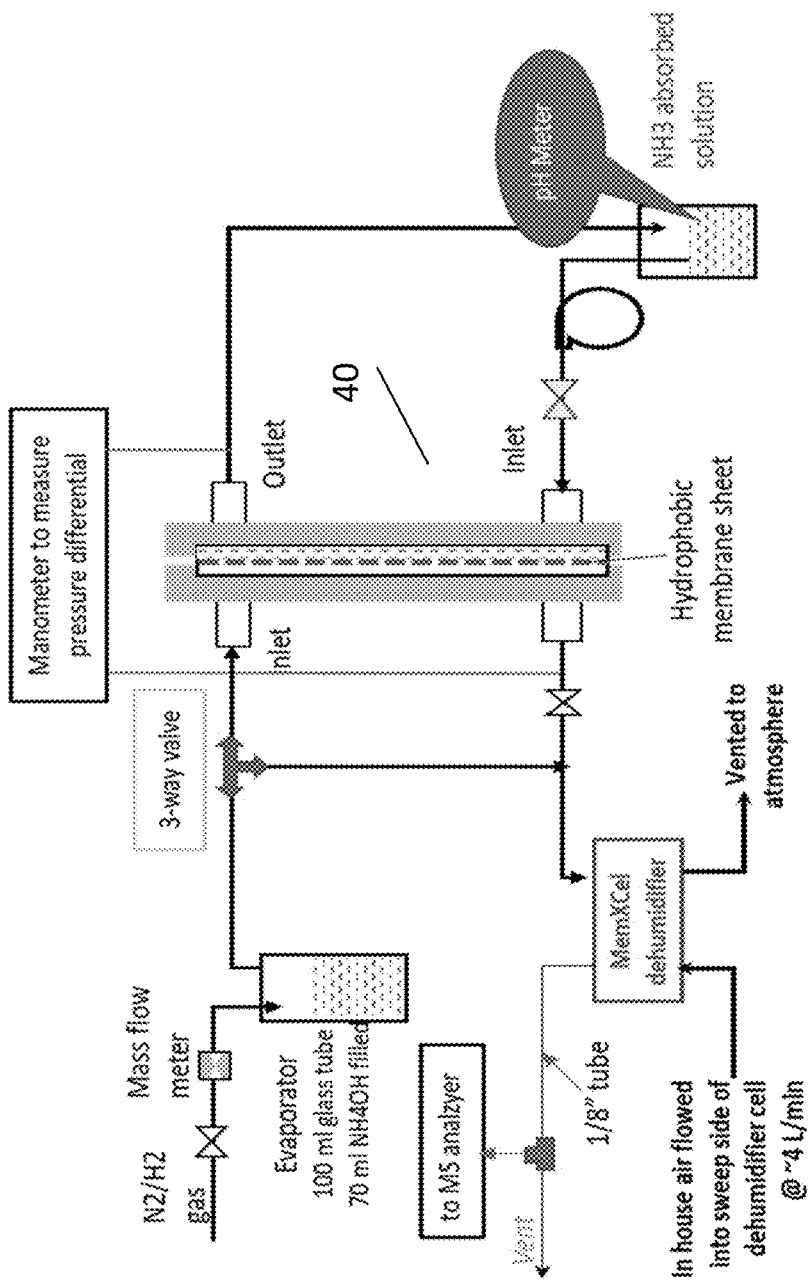
FIG. 21 is a schematic illustration of a gas/liquid membrane contactor for $NH_3$ gas absorption by liquid sorbent according to various embodiments.
Figure 22:
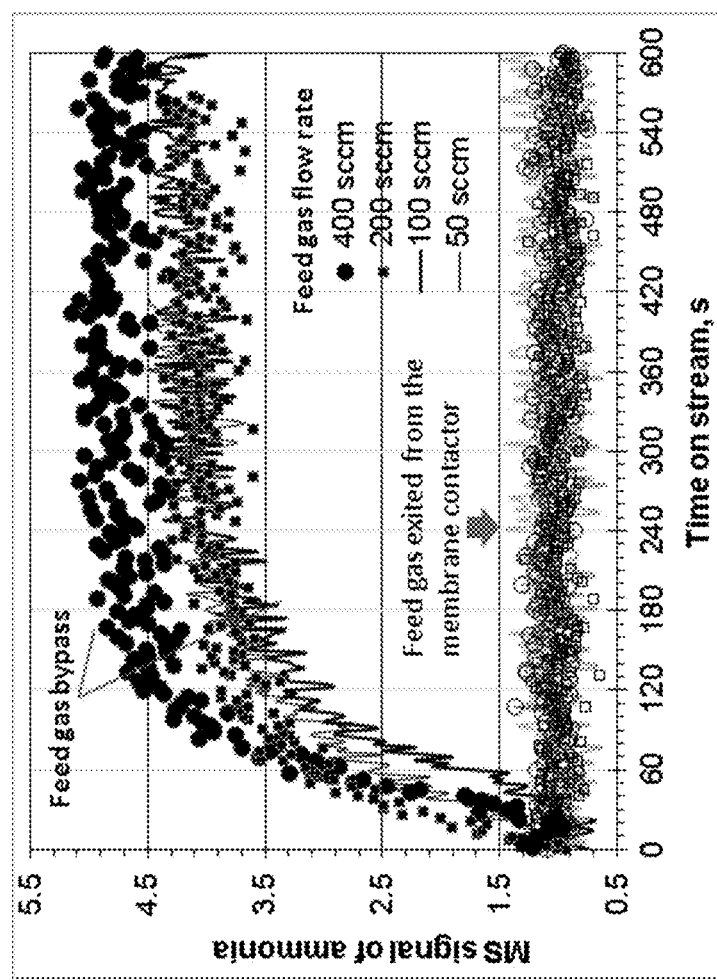
FIG. 22 is a plot of $NH_3$ absorption breakthrough curves as a function of time according to various embodiments.

A 5 cm×11 cm 50 μm-thin PTFE/metal sheet/ceramic (YSZ) membrane sheet 1 was loaded into the device shown in FIG. 1, which was made of Stainless steel (SS) for absorption of ammonia-containing gas with a water solution. FIG. 21 shows the process flow diagram of the testing setup. For $NH_3$ absorption, dilute $H_2SO_4$ solution initially at a pH of ~2.6 may be circulated through the sweep side with a liquid pump at velocity of 3.5 cm/s. A $H_2/N_2$ gas stream (50%-50%) may be mixed with the ammonia gas evaporated from a glass tube containing 4.3 wt. % $NH_4OH$ solution and introduced to the feed side of the membrane contactor. The gas feed side and liquid sweep side were nearly under atmospheric pressure. The absorption reaction was conducted at room temperature (24° C.). Ammonia gas diffused across the membrane and reacted with the solution rapidly. As a result, pH of the liquid solution increased rapidly with time. The gas exit composition was dehumidified by an inline membrane dehumidifier as described in the previous example and monitored by an online Mass Spec analyzer. The feed gas flow velocity was varied from 2.5 to 20 cm/s. FIG. 22 shows the ammonia absorption break through curves at four different gas feed rates, while the liquid feed rate was kept constant. No ammonia breakthrough was detected within the time of 600 seconds measured under all the testing conditions, indicating nearly complete absorption of ammonia gas by the solution. For comparison, the ammonia was detected at its plateau within 120 seconds when the same feed gas bypassed the contactor.

Example VII. Dispersion of Gas into Liquid Fluid

Figure 23:
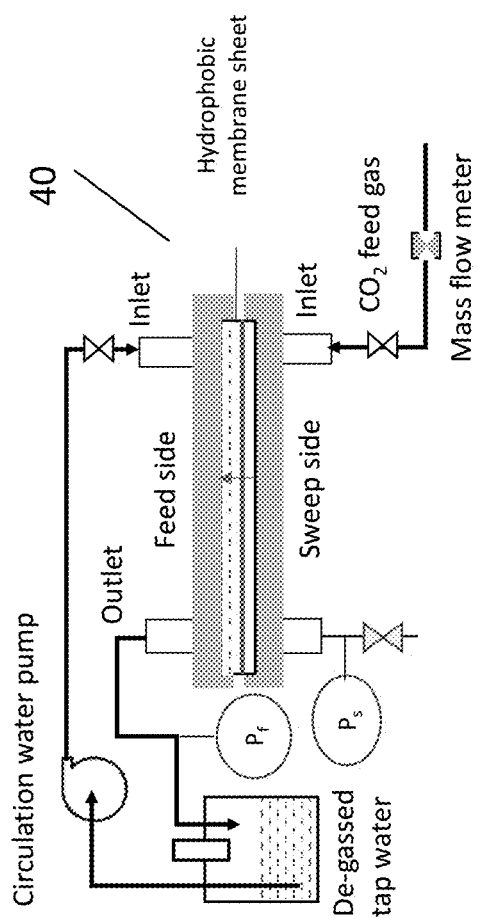
FIG. 23 is a schematic illustration of a setup of gas/liquid membrane contactor for dispersion of gas into liquid fluid according to various embodiments.
Figure 24B:
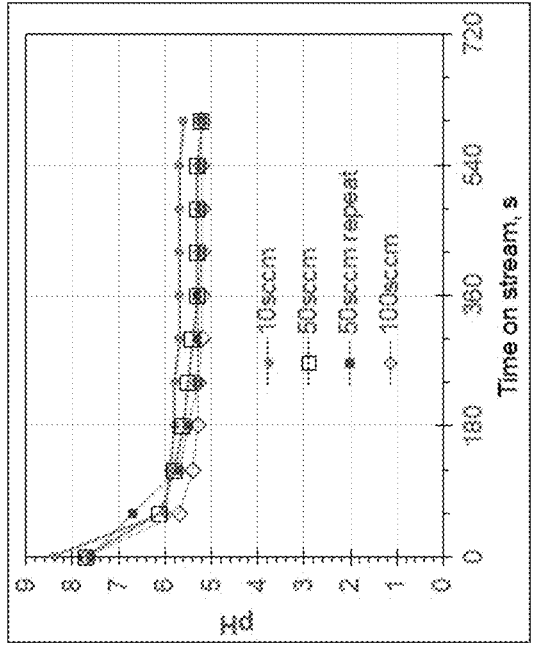
FIG. 24B is a plot of pH as a function of time of a gas/liquid membrane contactor for dispersion of $CO_2$ gas into tap water according to various embodiments.
Figure 24A:
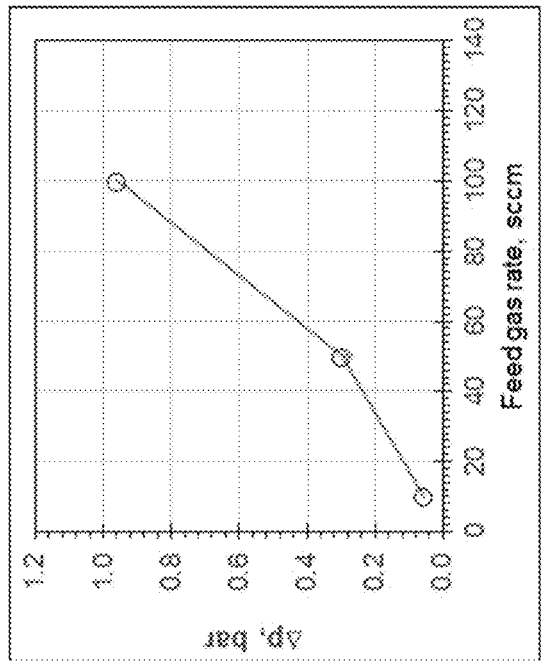
FIG. 24A is a plot of the pressure gradient as a function of feed rate of a gas/liquid membrane contactor for dispersion of $CO_2$ gas into tap water according to various embodiments.

A 5 cm×11 cm×50 μm-thin PTFE/nickel/YSZ sheet membrane 1 was loaded into the test cell 40 shown in FIG. 1 for introduction of gas into a liquid. The cover plates 6, 9 of the device are made of transparent polycarbonate (PC) for visualization. FIG. 23 shows the setup for experimental tests. The PTFE coating used in this example was 0.125 mg/cm². The liquid contacted the YZ-coated side as sweep side, while the gas stream contacted with the PTFE coating surface as feed side. Degassed tap water was circulated on the sweep side continuously, while the feed gas was introduced into the liquid through the membrane. Different from examples 5 and 6, outlet of the feed gas was blocked so that all the feed gas passed through the membrane 1 and got introduced into the water as tiny gas bubbles. The tap water was circulated at constant velocity of 7.7 cm/s and temperature of 23.5° C. With the hydrophobic membrane 1, the feed gas pressure must be increased to a certain level to break up the liquid and permeate through the membrane. FIG. 24A shows that the pressure gradient requirement increases with feed gas rate. At 100 sccm feed gas rate, about 1 bar pressure gradient is required for the gas to enter the liquid side. FIG. 24b shows that pH of the tap water decreased rapidly as $CO_2$ gas was dissolved into it within about 120 seconds for the three gas feed rates tested. At the low feed gas rate, gas bubbles were too small to be observed by naked eyes. Mass transfer rate of gas into liquid may increase with decreasing the gas bubble size. The membrane contactor can be used to intensify mixing and absorption of gas into a liquid phase, such as aeration and carbonation.

Example VIII. Device with Multiple Membrane Sheets

Figure 25:
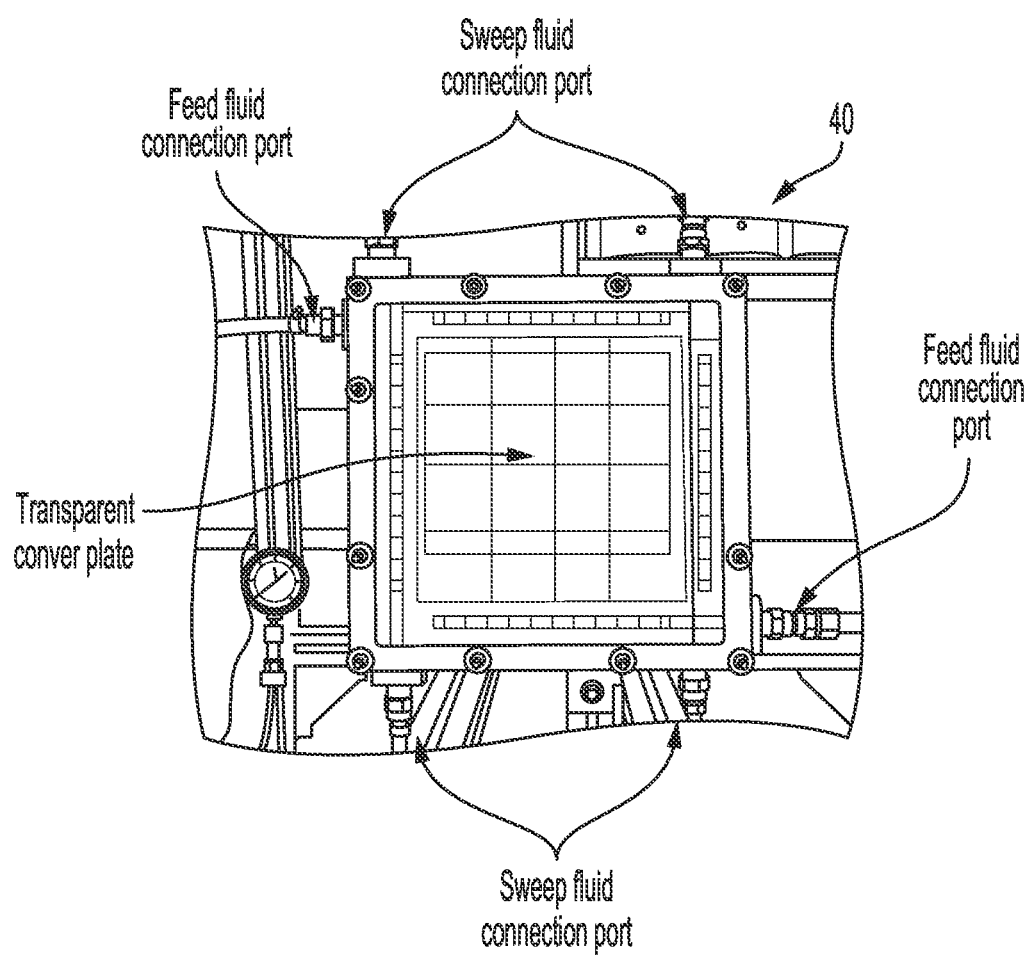
FIG. 25 is a photograph of a device including multiple membrane sheets according to various embodiments.
Figure 26:
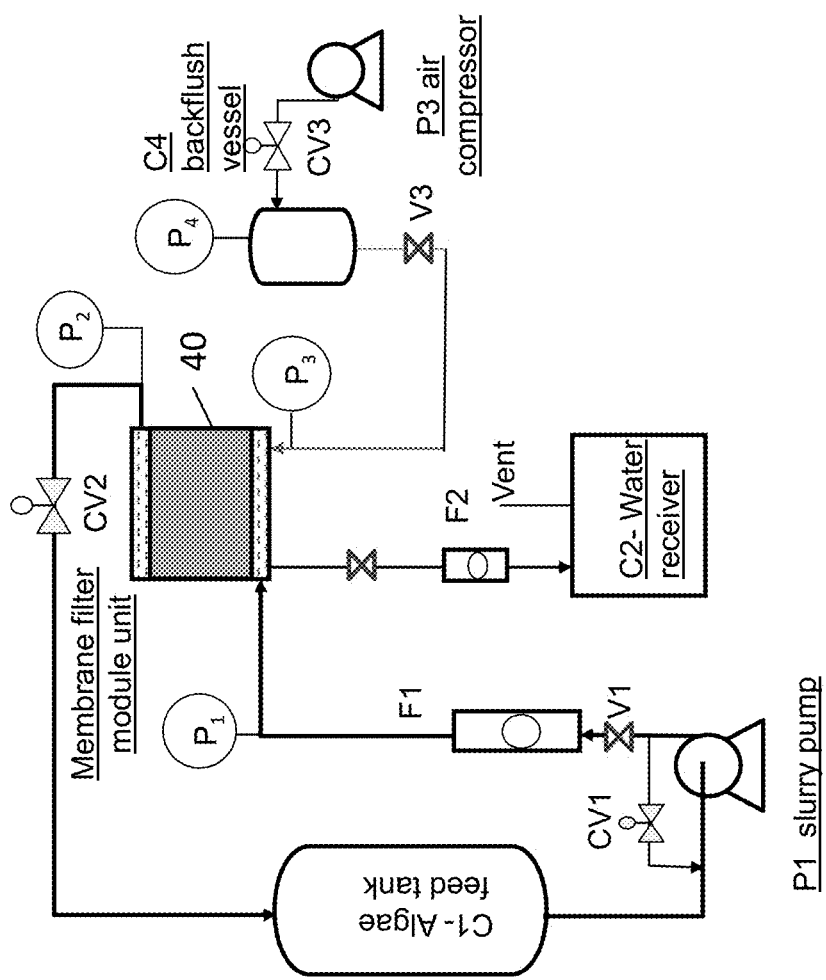
FIG. 26 is a schematic illustration of a device including multiple membrane sheets for algal filtration according to various embodiments.

The components as shown in FIGS. 2-5 may be fabricated to make a larger device with a group of identical membrane sheets 1. The cassette half frame 20 may be made of PPO/glass fiber composite in a size that fits to 21 cm×21 cm membrane sheets. However, other sizes of membrane sheets 1 may be used as well. The feed side and sweep side sealing gaskets 3, 5 may be made of Viton. In case of liquid filtration applications, the sweep side may be referred to as the permeate side. The cover plates may be made of polycarbonate. A 21 cm×21 cm×50 μm porous nickel membrane sheet, or any other suitable size, may bonded onto one cassette half frame 20. A group of 20 the half cassette frames 20 may be stacked together with the cover plates 6, 9 to form a working module as shown in FIG. 25. The feed channel spacing may be 1-3 mm, such as 1.3 mm, while the sweep (or permeate) side spacing may be 1-3 mm, such as 2.0 mm. The module may be used to filtrate microalgae in a cross-flow operation mode with the process flow shown in FIG. 26.

A dense monoculture of microalgae (322.5 mg/L) may be used as the feed fluid. In an embodiment, during filtration operation, no fluid is introduced from the sweep side. The top sweep fluid connection port may be exposed atmospheric air, while the bottom sweep fluid connection port may be used to drain the permeated water to a receiving tank. During membrane cleaning, sweep fluid (or cleaning fluid) may be introduced from the port to backflush the membrane sheet. The membrane module shows high flux at the pressure gradient of only 0.17 bar between the feed and permeate side. Five (5) gallons of feed may be filtered down to 1.2 gallons in 10 min at a feed linear velocity of 2.5 cm/s. Table 2 compares properties of the feed and permeate. Turbidity may be reduced from 117 NTU for the feed to 0.0 NTU, while the total dissolved salts (TDS), conductivity, and pH stay about the same. The porous nickel sheet membrane 1 may be effective for blocking of all the algae cells 40 and particulates in the feed culture. After the filtration run, the membrane was briefly backflushed with 10 pulses of the permeate at 0.17 bar to unclog the pores. In the second filtration run, the concentrate from first run was mixed back with the permeate as the feed fluid. The flux could be maintained at slightly higher feed flow pressure. Subsequent chemical cleaning restored the flux back to normal.

TABLE 2

Properties of the algae culture and permeate

|  | Feed | Permeate |
| --- | --- | --- |
| pH | 9.8 | 9.8 |
| Turbidity, ntu | 117 | 0 |
| TDS, ppm | 551 | 520 |
| conductivity, uS/cm | 1172 | 1106 |
| Appearance | Green with particulates | Completely clear |

Referring to all drawings and according to various embodiments of the present disclosure, a device for mass transfer or mass exchange between two fluid streams is provided. The device for mass transfer or mass exchange between two fluid streams includes: at least one membrane sheet 1 having a thickness of 0.02-0.2 mm configured to selectively allow a desired fluid or molecules to permeate while blocking others; a membrane supporting structure 2 configured to support the membrane sheet 1; a plurality of channels 12 having a hydraulic diameter from 0.3 to 3.0 mm on a first surface of the membrane; a channel 4 of hydraulic diameter from 0.3 to 3.0 mm on a second surface of the membrane, the second surface opposite the first surface; a first sealing gasket 5 on the first surface configured to isolate feed flow from sweep flow and to isolate a membrane working area from the environment; a second sealing gasket 3 on the second surface configured to isolate the sweep flow from the feed flow and to isolate the membrane working area from the environment; and two cover plates 6, 9 configured to compress at least the first sealing gasket 5 to prevent fluid leakage, wherein the first surface comprises a feed flow side and the second surface comprises a sweep flow side.

In one embodiment, the device for mass transfer or mass exchange between two fluid streams includes a plurality of ports 7, 10 on each of the two cover plates 6, 9 to provide a feed flow to the channels on the feed flow side of the membrane sheet 1 and to provide the sweep flow to the channels on the sweep flow side of the membrane sheet 1. In one embodiment, the first sealing gasket 5 material is selected from the group consisting of silicone, graphite, a polymer composite, a graphite composite, or a soft metal. In one embodiment, the membrane sheet 1 comprises a porous membrane having pores in the range of 2 nm to 1000 nm. In an embodiment, the porous membrane comprises a porous metal sheet. In an embodiment, the porous membrane further comprises a porous ceramic layer, wherein pores in the porous ceramic layer are smaller than pores of the porous metal sheet. In an embodiment, the membrane sheet 1 comprises a molecular sieve. In an embodiment, the molecular sieve membrane comprises a water molecule-selective zeolite membrane supported on a thin porous metal sheet. In an embodiment, the membrane sheet 1 comprises a porous hydrophobic membrane configured to disperse the feed gas fluid into water or aqueous sweep fluid under a pressure gradient. In an embodiment, the membrane sheet 1 comprises a porous hydrophobic membrane. In an embodiment, the porous hydrophobic membrane comprises a porous metal sheet coated with a porous layer of polytetrafluoroethylene or grown with a layer of silicalite. In an embodiment, the membrane supporting structure 2 comprises a polymer or polymer composite. In an embodiment, the membrane supporting structure 2 comprises stainless steel. In an embodiment, the device for mass transfer or mass exchange between two fluid streams further includes two flow distribution slots located on opposite sides of the membrane sheet 1 and configured for distribution of the feed flow into the feed channels on the membrane sheet 1 or for distribution of the sweep flow into the sweep flow channels on the membrane sheet 1. In an embodiment, the device for mass transfer or mass exchange between two fluid streams further includes a first pair of flow distribution slots located on opposite sides of the membrane sheet 1 and configured for distribution of the feed flow into the feed channels 4 on the membrane sheet 1 and a second pair flow distribution slots located on the opposite sides of the membrane sheet 1, wherein the second pair of flow distribution slots are oriented 90 degrees to the first pair of flow distribution slots.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A device for mass transfer or mass exchange between two fluid streams comprising:
    at least one membrane sheet having a thickness of 0.02-0.2 mm configured to selectively allow a desired fluid or molecules to permeate while blocking others;
    a membrane supporting structure configured to support the membrane sheet, to enable a feed flow to contact a feed side of the membrane sheet, and to enable a sweep flow to contact a sweep side of the membrane sheet;
    a plurality of feed channels having a hydraulic diameter from 0.3 to 3.0 mm on the feed side of the membrane sheet;
    a plurality of sweep channels having a hydraulic diameter from 0.3 to 3.0 mm on the sweep side of the membrane sheet;
    a sealing mechanism to isolate the feed flow from the sweep flow and to isolate a membrane working area from an external environment;
    a feed cover plate including feed fluid inlet and outlet ports extending perpendicular to the feed side of the membrane sheet and connecting a feed fluid to the plurality of feed channels; and
    a sweep cover plate including sweep fluid inlet and outlet ports extending perpendicular to the sweep side of the membrane sheet and connecting a sweep fluid to the plurality of sweep channels, the feed cover plate and sweep cover plate being configured to compress the sealing mechanism to prevent fluid leakage.

2. The device of claim 1, further comprising:
    feed flow distribution slots on the feed cover plate for distributing the feed fluid to the plurality of feed channels; and
    sweep flow distribution slots on the sweep cover plate for distributing the sweep fluid to the plurality of sweep channels.

3. The device of claim 1, wherein the sealing mechanism comprises a sealing gasket comprising a material selected from a group consisting of silicone, graphite, a polymer composite, a graphite composite, and a soft metal.

4. The device of claim 1, wherein the membrane supporting structure includes at least one of the plurality of feed channels or the plurality of sweep channels.

5. The device of claim 4, wherein the membrane sheet comprises a porous metal sheet for filtering particulates from the feed fluid, and the sweep fluid comprises the filtered fluid and is output from the sweep cover plate under a pressure differential between the feed side of the membrane sheet and the sweep side of the membrane sheet.

6. The device of claim 1, wherein the membrane sheet comprises a porous ceramic layer for filtering particulates from the feed fluid, and the sweep fluid comprises the filtered fluid and is output from the sweep cover plate under a pressure differential between the feed side of the membrane sheet and the sweep side of the membrane sheet.

7. The device of claim 1, wherein the feed fluid and the sweep fluid have different partial pressures of water vapor, and the membrane sheet comprises a molecular sieve membrane for exchanging water molecules between the feed fluid and sweep fluid, and blocking crossover of molecules other than water in the feed fluid.

8. The device of claim 1, wherein the feed fluid comprises a liquid water-based feed fluid and the sweep fluid comprises a gas sweep fluid, and the membrane sheet comprises a zeolite membrane for transporting water molecules from the liquid water-based feed fluid to the gas sweep fluid, driven by a chemical potential difference of water molecules between the feed fluid and the sweep fluid.

9. The device of claim 1, wherein the feed fluid comprises a humid feed gas stream, and the membrane sheet comprises a water-selective molecular sieve membrane for transporting water from the humid feed gas stream to the sweep side of the membrane sheet under a partial pressure gradient of water vapor.

10. The device of claim 1, wherein the feed fluid comprises a gas-phase feed fluid and the sweep fluid comprises a liquid-phase sweep fluid, and the membrane sheet comprises a porous hydrophobic membrane for transporting target molecules from the gas-phase feed fluid to the liquid-phase sweep fluid under a chemical potential differential of target molecules between the feed side of the membrane sheet and the sweep side of the membrane sheet, and keeping the gas-phase feed fluid separate from the liquid-phase sweep fluid.

11. The device of claim 10, wherein the feed fluid comprises a gas-phase feed fluid and the sweep fluid comprises a liquid-phase sweep fluid, and the membrane sheet comprises a porous membrane for transporting gas from the gas-phase feed fluid to the liquid-phase sweep fluid as gas bubbles, and keeping the gas-phase feed fluid separate from the liquid-phase sweep fluid.

12. The device of claim 1, wherein the membrane supporting structure comprises a polymer or polymer composite.

13. The device of claim 1, wherein the membrane supporting structure comprises stainless steel.

14. The device of claim 1, further comprising:
a first flow distribution slot located on the feed cover plate; and
a second flow distribution slot located on the sweep cover plate,
wherein the first flow distribution slot is configured to distribute the feed flow into the plurality of feed channels on the feed side of the membrane sheet by a 90-degree turn, and the second flow distribution slot configured to distribute the sweep flow into the plurality of sweep channels on the sweep side of the membrane sheet by a 90-degree turn.

15. The device of claim 1, wherein the membrane supporting structure comprises:
a first pair of flow distribution slots located at first opposite ends of the membrane sheet and connected to a feed fluid inlet port on the feed cover plate to distribute the feed flow throughout a first surface of the membrane sheet; and
a second pair of flow distribution slots located at second opposite ends of the membrane sheet and connected to a sweep fluid inlet port on the sweep cover plate to distribute the sweep flow throughout a second surface of the membrane sheet,
wherein the second pair of flow distribution slots are oriented 90 degrees to the first pair of flow distribution slots.

16. The device of claim 1, wherein at least one of the plurality of feed channels or the plurality of sweep channels are formed by gasket spacing.

17. The device of claim 1, wherein the plurality of feed channels comprise straight channels.

18. The device of claim 1, wherein the plurality of sweep channels comprise straight channels.

19. A method for mass transfer or mass exchange between two fluid streams comprising:
providing a feed fluid to a feed cover plate of a device for mass transfer or mass exchange between two fluid streams, and providing a sweep fluid to a sweep cover plate of the device for mass transfer or mass exchange between two fluid streams, wherein the device for mass transfer or mass exchange between two fluid streams comprises:
at least one membrane sheet having a thickness of 0.02-0.2 mm configured to selectively allow a desired fluid or molecules to permeate while blocking others;
a supporting structure configured to support the membrane sheet, and including a feed distribution slot for distributing a feed flow of the feed fluid throughout a first surface of the membrane sheet via a 90-degree turn, and a sweep distribution slot for distributing a sweep flow of the sweep fluid throughout a second surface of the membrane sheet via a 90-degree turn;
a plurality of feed channels having a hydraulic diameter from 0.3 to 3.0 mm on a feed side of the membrane sheet;
a plurality of sweep channels having a hydraulic diameter from 0.3 to 3.0 mm on a sweep side of the membrane sheet; and
a sealing mechanism configured to isolate the feed flow from the sweep flow and to isolate a membrane working area from an external environment,
wherein the feed cover plate and sweep cover plate are configured to compress the sealing mechanism to prevent fluid leakage, the feed cover plate is configured to connect the feed flow to the feed distribution slot, and the sweep cover plate is configured to connect the sweep flow to the sweep distribution slot; and
providing a gradient across the membrane sheet in pressure, partial pressure, concentration, or chemical potential.

20. The method of claim 19, further comprising removing fine particulates from the feed fluid.

21. The method of claim 19, wherein the feed fluid comprises a feed gas stream and the sweep fluid comprises a liquid sweep fluid, and the membrane sheet transports gas molecules or a fraction of a gas from the feed gas stream to the liquid sweep fluid.

22. The method of claim 19, further comprising removing water molecules from the feed fluid to the sweep fluid.

23. The method of claim 19, further comprising humidifying a gas from the feed fluid with water from the sweep fluid.

24. The method of claim 19, further comprising removing carbon dioxide from the feed fluid with an alkaline solution from the sweep fluid, wherein the alkaline solution comprises one of a carbonate solution, hydroxide solution, an amine solution, or mixture thereof.

* * * * *